(12) United States Patent
Shao et al.

(10) Patent No.: US 12,483,750 B2
(45) Date of Patent: Nov. 25, 2025

(54) DISPLAY DEVICE AND CONTROL METHOD THEREFOR

(71) Applicant: HISENSE VISUAL TECHNOLOGY CO., LTD., Shandong (CN)

(72) Inventors: Xiaoming Shao, Shandong (CN); Jie Dong, Shandong (CN); Guili Jia, Shandong (CN); Hui Jiang, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 15 days.

(21) Appl. No.: 18/405,900

(22) Filed: Jan. 5, 2024

(65) Prior Publication Data
US 2024/0146996 A1   May 2, 2024

Related U.S. Application Data

(63) Continuation of application No. PCT/CN2022/102403, filed on Jun. 29, 2022.

(30) Foreign Application Priority Data

Jul. 13, 2021 (CN) .................. 202110791222.X
Aug. 13, 2021 (CN) .................. 202110931920.5
Aug. 13, 2021 (CN) .................. 202110931927.7

(51) Int. Cl.
*H04N 21/436* (2011.01)
*H04N 21/41* (2011.01)
(Continued)

(52) U.S. Cl.
CPC ... *H04N 21/43637* (2013.01); *H04N 21/4122* (2013.01); *H04N 21/4221* (2013.01); *H04N 21/485* (2013.01)

(58) Field of Classification Search
None
See application file for complete search history.

(56) References Cited

U.S. PATENT DOCUMENTS

2015/0327309 A1   11/2015   Gaerdenfors
2016/0127673 A1   5/2016    Lee et al.
(Continued)

FOREIGN PATENT DOCUMENTS

CN   103578246 A   2/2014
CN   105681886 A   6/2016
(Continued)

OTHER PUBLICATIONS

International Search Report, mailed Sep. 20, 2022, from PCT/CN2022/102403, 5 pages.
(Continued)

*Primary Examiner* — Samira Monshi
(74) *Attorney, Agent, or Firm* — ANOVA LAW GROUP, PLLC

(57) ABSTRACT

A display apparatus and a control method are provided in the present disclosure. The display device includes a display configured to display content from a broadcast system or network and/or a user interface; one or more external device interfaces, configured to communicate with one or more external devices according to a communication protocol, where the communication protocol includes a Bluetooth protocol and an infrared protocol; and at least one processor, in connection with the display and the one or more external device interfaces, and configured to execute instructions to cause the display apparatus to perform the control method.

16 Claims, 11 Drawing Sheets

(51) Int. Cl.
    *H04N 21/422* (2011.01)
    *H04N 21/4363* (2011.01)
    *H04N 21/485* (2011.01)

(56) References Cited

U.S. PATENT DOCUMENTS

| | | | |
|---|---|---|---|
| 2019/0378433 A1 | 12/2019 | Shimada et al. | |
| 2020/0374954 A1* | 11/2020 | Chen | H04W 12/50 |

FOREIGN PATENT DOCUMENTS

| | | | |
|---|---|---|---|
| CN | 106998496 | A | 8/2017 |
| CN | 109166159 | A | 1/2019 |
| CN | 109345813 | A | 2/2019 |
| CN | 305307578 | S | 8/2019 |
| CN | 110662097 | A | 1/2020 |
| CN | 110784858 | A | 2/2020 |
| CN | 111127861 | A | 5/2020 |
| CN | 111542031 | A | 8/2020 |
| CN | 111885556 | A | 11/2020 |
| CN | 112068741 | A | 12/2020 |
| CN | 112073955 | A | 12/2020 |
| CN | 112118468 | A | 12/2020 |
| CN | 1121148468 | A | 12/2020 |
| CN | 112187937 | A | 1/2021 |
| CN | 112911380 | A | 6/2021 |
| CN | 113630655 | A | 11/2021 |
| JP | 2011162140 | A | 8/2011 |
| WO | 2017040543 | A1 | 3/2017 |
| WO | 2017148060 | A1 | 9/2017 |

OTHER PUBLICATIONS

Chinese First Office Action, mailed Mar. 3, 2022, from Chinese Patent Application No. 202110791222.X, 14 pages.
Chinese Second Office Action, mailed Oct. 8, 2022, from Chinese Patent Application No. 202110791222.X, 14 pages.
Chinese First Office Action, mailed Sep. 8, 2022, from Chinese Patent Application No. 202110931920.5, 15 pages.
Chinese Second Office Action, mailed Mar. 17, 2023, from Chinese Patent Application No. 202110931920.5, 14 pages.
Chinese First Office Action, mailed Sep. 20, 2022, from Chinese Patent Application No. 202110931927.7, 13 pages.
Instructions for Using Hisense Smart TV Remote Control, Apr. 9, 2019, https://jingyan.baidu.com/article/2d5afd691e566085a2e28eef.html.
Chinese Notification to Grant Patent Right for Invention, mailed Jan. 11, 2025, for Chinese App. No. 202110791222.X, 7 pages.
Zhou, Pingshan, "Research and Implementation of Wireless Home Area Network Based on Top-Box and RF4CE", Thesis submitted to Nanjing University of Posts and Telecommunications for the Degree of Master of Engineering, Apr. 4, 2014, English Abstract Submitted.

* cited by examiner

DISPLAY DEVICE AND CONTROL METHOD THEREFOR

CROSS REFERENCE TO RELATED APPLICATION

The application is a continuation application of International Application No. PCT/CN2022/102403, filed on Jun. 29, 2022, which claims the priorities to Chinese Patent Application No. 202110791222.X filed on Jul. 13, 2021, Chinese Patent Application No. 202110931920.5 filed on Aug. 13, 2021, and Chinese Patent Application No. 202110931927.7 filed on Aug. 13, 2021, the contents of which are incorporated herein by reference.

FIELD

The application relates to the technical field of display apparatus, and in particular to a display apparatus and control method.

BACKGROUND

A display apparatus can include a TV, a TV with a set-top box, a box, and it usually is a product with a display screen. Taking TV as an example, the TV is being used in more and more scenarios, not only as a device for watching TV programs at home, but also for playing games, playing electronic photo albums, and displaying information, etc. In a development process of interaction capabilities between the display apparatus and a peripheral device (also called an external device), the display apparatus acts as a fully open platform. When interacting with the peripheral device, the peripheral device acts as an input device, and the display apparatus acts as a display, it can be seen that scene interaction is mainly presented at the display apparatus. In many scenarios where the display apparatus interacts with the peripheral device, as the TV becomes more intelligent, it can provide more capabilities to interact with users, so that the light inside a room changes with the color of the TV screen, which greatly improves the viewing experience of the TV and brings users a better immersive experience.

Currently, the display apparatus generally has functions related to Bluetooth, and can be connected with external devices through the Bluetooth. As an open global specification for wireless data and voice communication, Bluetooth technology has brought many Bluetooth standard devices, such as a Bluetooth speaker, a Bluetooth keyboard, a Bluetooth mouse, and a Bluetooth remote controller. The display apparatus can also be used as a standard Bluetooth device, which can be scanned by external devices such as various other Bluetooth devices or scan other Bluetooth devices for pairing and connection.

SUMMARY

Embodiments of the present disclosure provide a display apparatus, including: a display, configured to display content from a broadcast system or network and/or a user interface; one or more external device interfaces, configured to communicate with one or more external devices according to a communication protocol, where the communication protocol includes a Bluetooth protocol and an infrared protocol; and at least one processor, in connection with the display and the one or more external device interfaces, and configured to execute instructions to cause the display apparatus to: in response to an instruction received from a first external device according to a first communication protocol, determine whether the display apparatus is paired and connected with the first external device according to a second communication protocol; in response to determining that the display apparatus and the first external device have been paired and connected according to the second communication protocol, control the first external device to automatically unpair with the display apparatus according to the second communication protocol, to enable the display apparatus to unpair with the first external device; and in response to determining that the display apparatus has not yet paired and connected with the first external device according to the second communication protocol, control the first external device to pair with the display apparatus according to the second communication protocol without a further operation from a user, control the display to present prompt information of a change of a connection state according to the change of the connection state of the display apparatus, and control the display to present pairing success information after the display apparatus has been paired and connected with the external device according to the second communication protocol.

Embodiments of the present disclosure provide a control method for a display apparatus, and including: in response to an instruction received from a first external device according to a first communication protocol, determining whether the display apparatus is paired and connected with the first external device according to a second communication protocol; wherein the display apparatus communicates with one or more external devices according to a communication protocol, and the communication protocol includes a Bluetooth protocol and an infrared protocol; in response to determining that the display apparatus and the first external device have been paired and connected according to the second communication protocol, controlling the first external device to automatically unpair with the display apparatus according to the second communication protocol, to enable the display apparatus to unpair with the first external device; and in response to determining that the display apparatus has not yet paired and connected with the first external device according to the second communication protocol, controlling the first external device to pair with the display apparatus according to the second communication protocol without a further operation from a user, presenting prompt information of a change of a connection state according to the change of the connection state of the display apparatus, and presenting pairing success information after the display apparatus has been paired and connected with the external device according to the second communication protocol.

DETAILED DESCRIPTION

Some embodiments of the present disclosure will be described below with reference to the drawings in conjunction with some embodiments of the present disclosure. Apparently, the described embodiments are only some embodiments of the present disclosure, but not all of the embodiments of the present disclosure.

Figure 1:
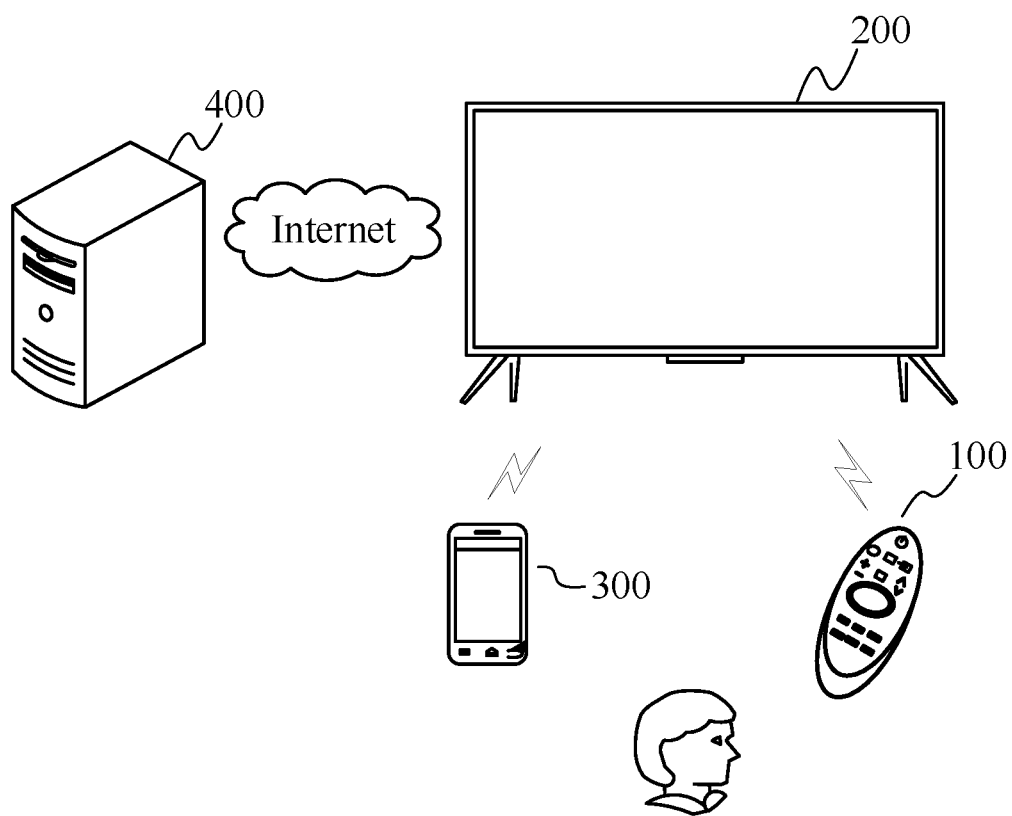
FIG. 1 is a schematic diagram of an operation scenario between a display apparatus and a control device according to some embodiments of the present disclosure.

It should be noted that the brief description of the terms in the present disclosure is only for the convenience of understanding the embodiments described below, and is not intended to limit the embodiments of the present disclosure. These terms are to be understood according to their ordinary and plain meaning unless otherwise stated. FIG. 1 is a schematic diagram of an operation scenario between a display apparatus and a control device according to some embodiments. As shown in FIG. 1, a user may operate the display apparatus 200 through a mobile terminal 300 and the control device 100.

In some embodiments, the control device 100 may be a remote controller, and the communication between the remote controller and the display apparatus can include infrared protocol communication, Bluetooth protocol communication, and other short-distance communication methods, etc., and the display apparatus 200 is controlled by wireless or other wired methods.

In some embodiments, a mobile terminal, a tablet computer, a computer, a laptop, and other devices can also be used to control the display apparatus 200.

In some embodiments, the mobile terminal 300 can communicate with the display apparatus 200 through a network communication protocol to achieve the purpose of one-to-one control operation and data communication. For example, a control instruction protocol may be established between the mobile terminal 300 and the display apparatus 200, to show the keyboard of the remote controller on the mobile terminal 300, and to control the display apparatus 200 by controlling the user interface on the mobile terminal 300. The audio and video content displayed on the mobile terminal 300 may also be transmitted to the display apparatus 200 to realize synchronous display function.

As further shown in FIG. 1, the display apparatus 200 performs data communication with a server 400 through various communication methods. The display apparatus 200 can communicate via a local area network (LAN), a wireless local area network (WLAN), and other networks.

The display apparatus 200 may be a liquid crystal display, an organic light-emitting diode (OLED) display, or a projection display apparatus.

In addition to providing a broadcasting and receiving function, the display apparatus 200 can further provide an additional network television function that a computer supports, including but not limited to: network television, internet protocol television (IPTV) and so on.

Figure 2:
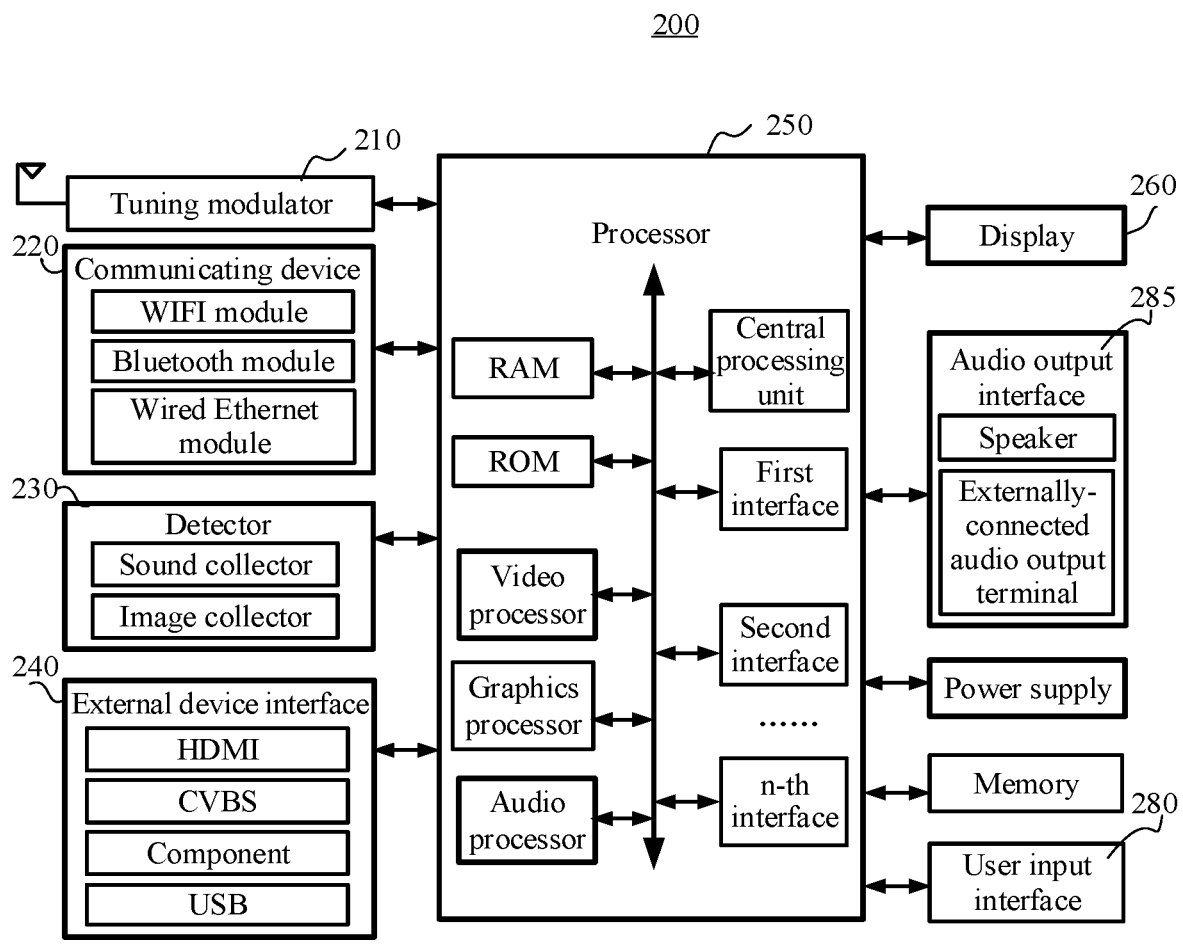
FIG. 2 is a block diagram of a hardware configuration of a display apparatus 200 according to some embodiments of the present disclosure.

FIG. 2 is a block diagram of a hardware configuration of a display apparatus 200 according to some embodiments.

In some embodiments, the display apparatus 200 can include at least one processor 250, a tuning modulator 210, a communicating device 220, a detector 230, an input/output interface, a display 260, an audio output interface 285, a memory, a user input interface 280, a power supply, or an external device interface 240.

In some embodiments, as shown in FIG. 2, the input/output interface is configured to have data transmission between the processor(s) 250 and other external devices or other processors 250, such as receiving video signal data and audio signal data from the external devices, or instruction data from the external devices, etc.

In some embodiments, the display apparatus 200 can adaptively adjust the display color temperature of the image. For example, in an environment with a relatively high temperature, the display apparatus 200 can be adjusted to display an image with a cooler tone, or in an environment with a relatively low temperature, the display apparatus 200 can be adjusted to display an image with a warmer tone.

Figure 3:
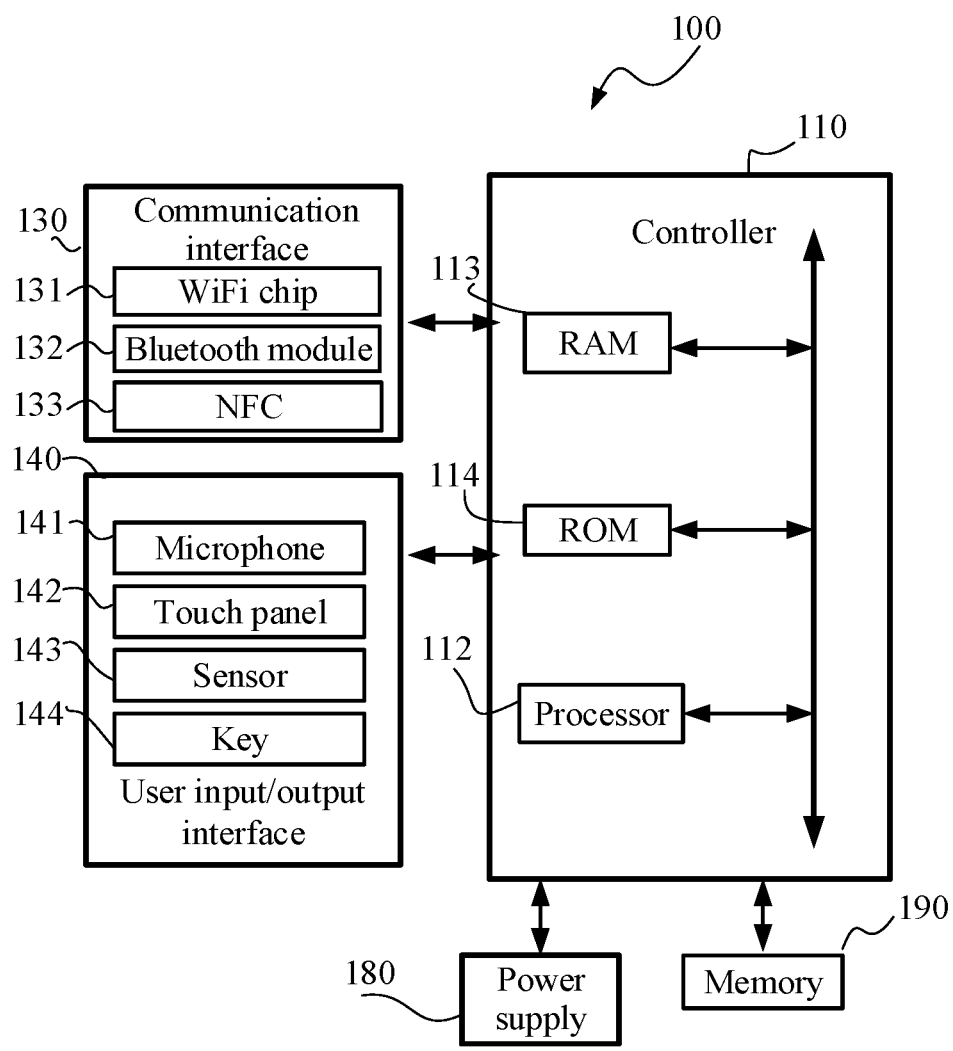
FIG. 3 is a block diagram of a hardware configuration of a control device 100 according to some embodiments of the present disclosure.

FIG. 3 is a block diagram of a hardware configuration of the control device 100 according to some embodiments. As shown in FIG. 3, the control device 100 can include a controller 110, a communication interface 130, a user input/output interface, a memory 190, and a power supply 180.

The control device 100 is configured to control the display apparatus 200, receive an operation command from a user, and convert the operation command into an instruction that the display apparatus 200 can recognize and respond to, and play an intermediary role in the interaction between the user and the display apparatus 200. The controller 110 can include a processor 112, RAM 113 and ROM 114, a communication interface 130, a user input/output interface 140, and a communication bus. The controller 110 is used to control the running and operation of the control device 100, as well as the communication and cooperation between internal components, and a data processing function between external devices and internal components.

The communication interface 130 can realize communication of control signals and data signals with the display apparatus 200 under control of the controller 110, for example: sending a user input signal to the display apparatus 200. The communication interface 130 may include at least one of a WiFi chip 131, a Bluetooth module 132, an NFC module 133 and other near field communication modules.

The input interface of the user input/output interface 140 can include at least one of various input interfaces such as a microphone 141, a touch panel 142, a sensor 143, and a keyboard 144, etc.

The output interface of the user input/output interface 140 can include an interface for transmitting a user instruction received to the display apparatus 200. In some embodiments, the output interface may be an infrared interface or a radio frequency interface.

In some embodiments, the control device 100 can include at least one of a communication interface 130 and a user input/output interface 140. The control device 100 is equipped with a communication interface 130, such as WiFi, Bluetooth, NFC and other modules, which can send user input instructions to the display apparatus 200 through a WiFi protocol, a Bluetooth protocol, or an NFC protocol.

The memory 190 is used to store various operating programs, data and applications for driving and controlling the control device 100 under the control of the controller. The memory 190 can store various instructions from the user.

The power supply 180 is used to provide power support for the operation of each component of the control device 100 under the control of the controller. The power supply 180 may include a battery and related control circuits.

Figure 4:
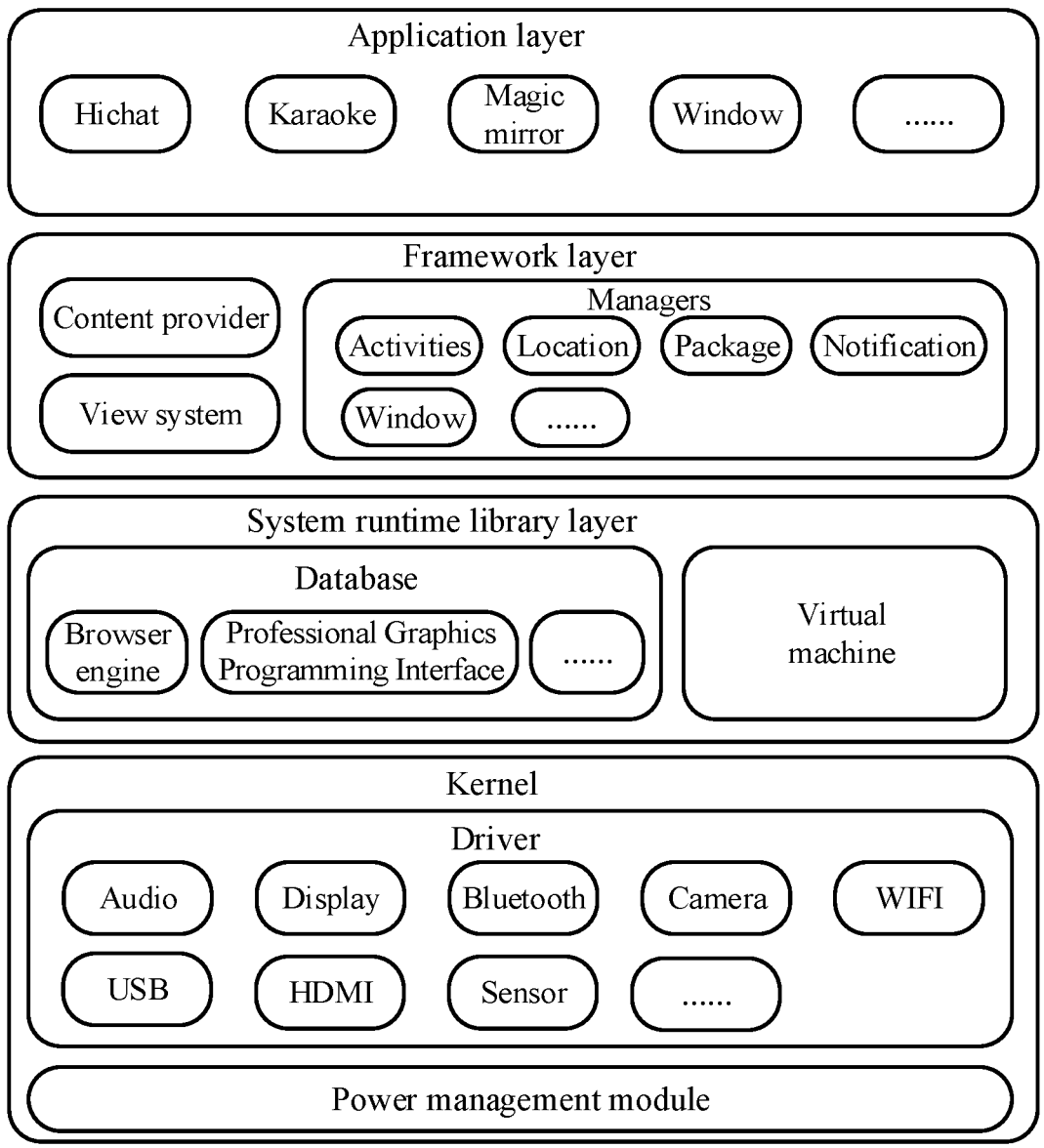
FIG. 4 is a schematic diagram of a software configuration of the display apparatus 200 according to some embodiments of the present disclosure.

FIG. 4 is a schematic diagram of software configuration in the display apparatus 200 according to some embodiments. Referring to FIG. 4, in some embodiments, the system can include four layers, from top to bottom, an applications layer, an application framework layer, Android runtime and system library layer (referred to as "system runtime library layer"), and a kernel layer.

Figure 5:
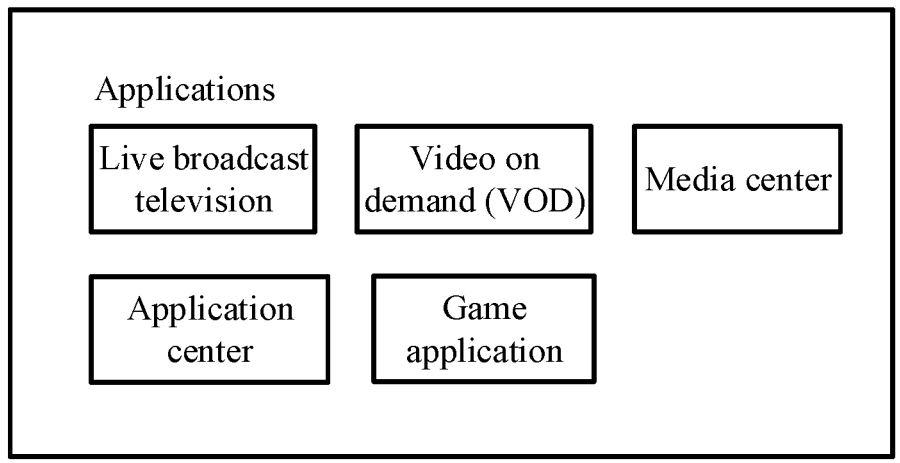
FIG. 5 is a schematic diagram of displaying application icon(s) in the display apparatus 200 according to some embodiments of the present disclosure.

FIG. 5 is a schematic diagram of displaying application icons in the display apparatus 200 according to some embodiments. In some embodiments, as shown in FIG. 5, the application layer can include at least one application with icons on the display, such as, a live TV application icon, a video on demand application icon, a media center application icon, an application center icon, a game application icon, etc.

In some embodiments, when the display apparatus is used as the display terminal to interact with a peripheral device, the peripheral device only serves as an input device. The interactive content between the display apparatus and the peripheral device is only presented on the display apparatus, so that the content of the display apparatus is relatively closed. The display apparatus does not share information with the peripheral device, so that the peripheral device will not change accordingly during the interaction process, which will lead to a relatively single presentation form of the content in the interactive scenario, and poor user experience.

In order to provide users with enhanced atmosphere and better user experience when using the display apparatus to perform entertainment interactions such as games playing and singing, the embodiments of the present disclosure provide a display apparatus that can control the display color of the peripheral device to change with the color change of the image in an entertainment interaction scenario such as playing a TV image, playing a game or singing a song.

In order to realize the color change of the peripheral device, the peripheral device interacting with the display apparatus can be a device that can emit light and change color, for example, a lamp bulb that can change color, a LED light bar, a light strip, an ambient light, etc. The display color of the peripheral device changes with the color of the image on the display apparatus, which can enhance the atmosphere of the display content, enrich the presentation form of the display content, and improve the user experience.

Figure 6:
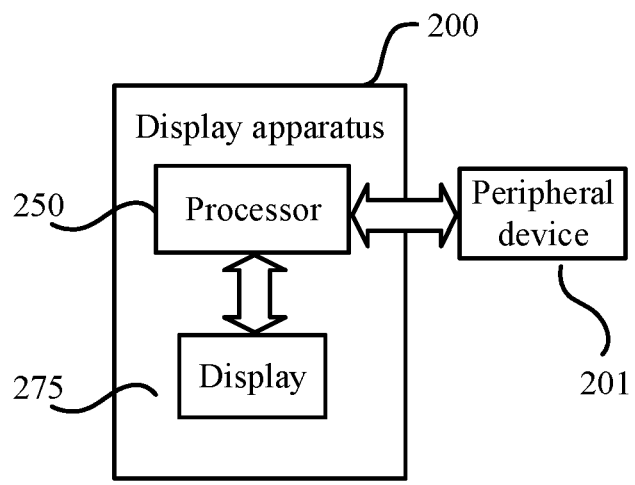
FIG. 6 is a structural block diagram of a display apparatus according to some embodiments of the present disclosure.

FIG. 6 is a structural block diagram of a display apparatus according to some embodiments. Some embodiments of the present disclosure provide a display apparatus 200, referring to FIG. 6, which can include a display and at least one processor in connection with the display 275. The display 275 is configured to present an image from broadcast system or network. The display apparatus can connect with the peripheral device 201, the peripheral device 201 is a device that can emit light and change color, and is configured to present the logo or icon of the external device on the display of the display apparatus, and can present different colors according to different external devices. The display apparatus is used to synchronize the color of the image displayed on the display 275 to the peripheral device 201 in real time, so that the display color of the peripheral device 201 is updated synchronously with the color of the image shown on the display, and the image can be any image displayed on the display, such as video, a user interface for user operation, or a combination of a video and a user interface. The display apparatus can connect with peripheral devices through an interface or a port. The interface may include any suitable external device interface, for example, a network interface, such as a socket interface, for example, a display apparatus such as a TV serving as a socket server, and a peripheral device such as a smart lamp serving as a socket client. After starting up, the client can connect with the server, and the server can transmit the color value to the client; the USB interface can cause the display apparatus to communicate with a USB peripheral device through a USB transmission protocol; and the Bluetooth interface can transmit the color value through a Bluetooth transmission protocol.

In order to use peripheral devices to present the color of the image on the display of the display apparatus more accurately and enhance atmosphere, in some embodiments, there may be multiple peripheral devices interacting with the display apparatus at the same time. For example, four peripheral devices can be set, and each peripheral device can be connected with the display apparatus in a wired connection manner or a wireless connection manner, and it only needs to ensure that they are in the same local area network.

When using the wireless connection mode, the display apparatus is connected to a router, and the router assigns an LAN IP address to the display apparatus; then the peripheral device is connected to the router, and the router assigns an LAN IP address to the peripheral device. The connection between the display apparatus and each peripheral device in the same network segment can be realized through the router. In some embodiments, a Bluetooth connection may be used. All connected peripheral devices can be determined by the display apparatus through scanning.

Figure 7:
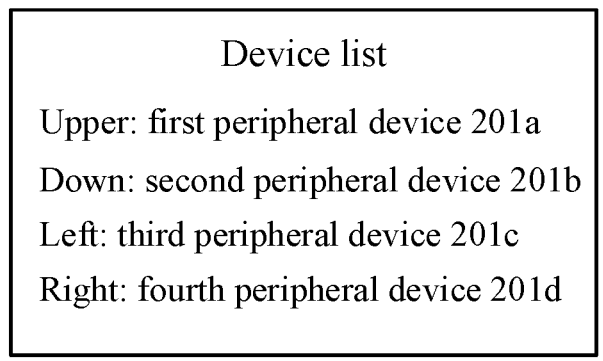
FIG. 7 is a schematic diagram of a device list according to some embodiments of the present disclosure.

FIG. 7 is a schematic diagram of a device list according to some embodiments. Referring to FIG. 7, when the display apparatus is scanning, it displays each scanned peripheral device in the device list. If four peripheral devices are scanned, the names of the four peripheral devices will be displayed in the device list.

Based on the device list, the name of each peripheral device can also be modified, and other devices not related to color rendering in the device list can also be deleted from the device list.

Figure 9:
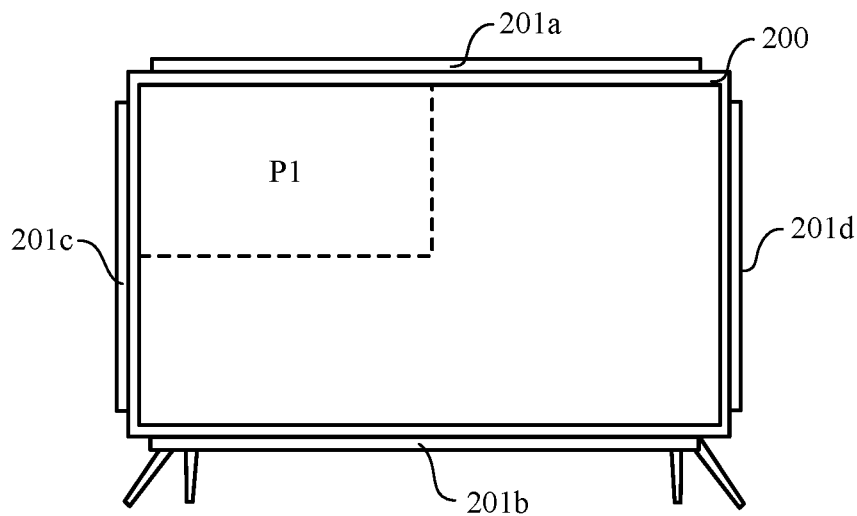
FIG. 9 is a schematic diagram of block division for picking color according to some embodiments of the present disclosure.

In some embodiments, a plurality of peripheral devices can be arranged around the display of the display apparatus (as shown in FIG. 9), taking four peripheral devices as an example, a first peripheral device 201a is disposed at the upper side of the display, a second peripheral device 201b is disposed at the lower side of the display, a third peripheral device 201c is disposed at the left side of the display, and a fourth peripheral device 201d is disposed at the right side of the display.

The four peripheral devices arranged around the display 275 can respectively present a color presented at a corresponding area of the image on the display, that is, the first peripheral device 201a presents the color(s) at the upper portion of the image; the second peripheral device 201b presents the color(s) at the lower portion of the image; the third peripheral device 201c presents the color(s) at the left portion of the image; and the fourth peripheral device 201d presents the color at the right portion of the image.

Each peripheral device corresponds to a corresponding area of the image on the display, so that the display color of a peripheral device can be updated synchronously with the color or colors of a corresponding area of the image, thereby improving the color display effect of the peripheral device.

At present, the method of directly extracting RGB color from the image on the display is used for the image on the display apparatus. RGB represents an image via three channels, which are red (R) channel, green (G) channel and blue (B) channel respectively. All other colors are generated by combining these three colors. The combined color is highly correlated with these three components, so it is not intuitive or visible for a user to change colors continuously. Another problem with the RGB color representation is that these three components are closely related to lightness, that is, as long as the light around the display apparatus changes, the three components will be changed accordingly, but there is no parameter for representing lightness in the RGB parameters. Therefore, when the color values extracted through the RGB method are synchronously displayed on the light-emitting peripheral device, the difference will be relatively large, thereby affecting the display effect.

Figure 8:
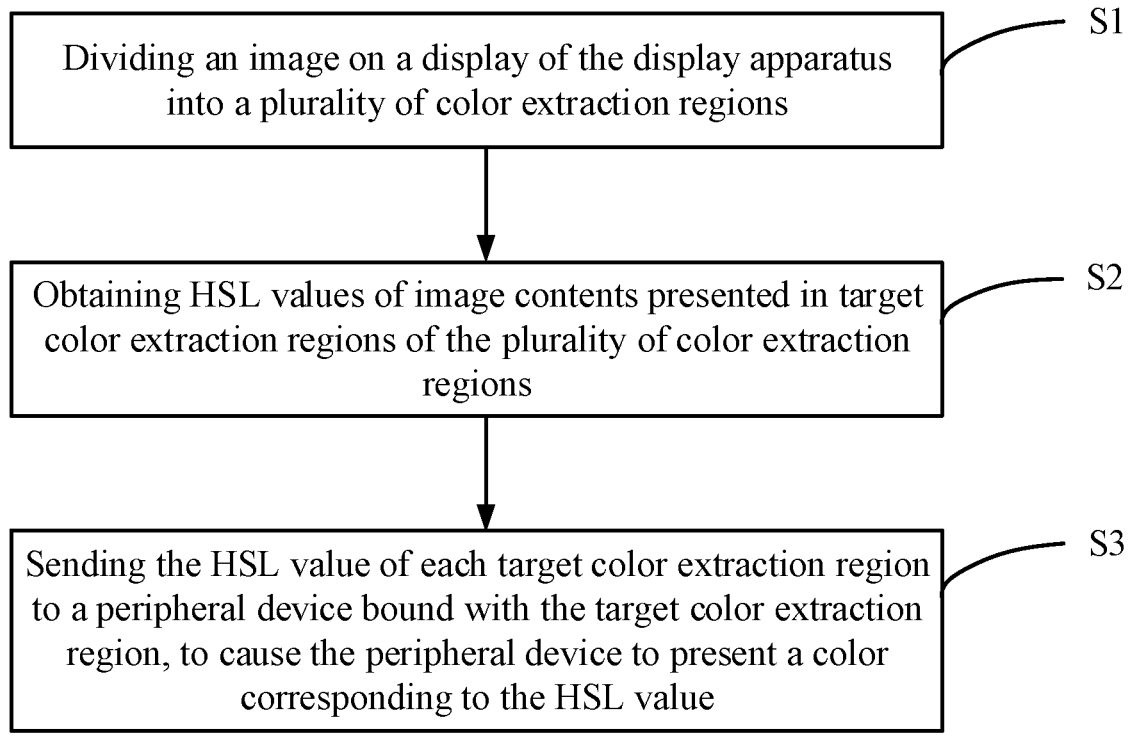
FIG. 8 is a schematic flow diagram of a method for changing a color of a peripheral device with color of an image on the display according to some embodiments of the present disclosure.

In view of this, the embodiments of the present disclosure provide a method for changing the color of the peripheral device with the color of the image on the display of the display apparatus. By extracting an HSL (Hue, Saturation, Lightness) value of the image on the display, the HSL value of the image is output to a peripheral device connected with or bound with the display apparatus. Since the HSL value contains the parameter lightness L that represents the lightness, therefore, compared with the color value extracted by RGB method, the HSL value can represent the color(s) of the image more intuitively. FIG. 8 is a flow chart of a method for changing the color of the peripheral device with a color of the image on the display according to some embodiments. The display apparatus according to the embodiments of the present disclosure, referring to FIG. 8, the processor(s) can be configured to execute instructions to cause the display apparatus to perform the following steps when changing the color of the peripheral device with the color of the image on the display.

S1. Dividing an image on a display of the display apparatus into a plurality of color extraction regions.

Since there may be multiple peripheral devices in connection with the display apparatus at the same time, the display color of each peripheral device will only change with color change of a corresponding area of the image on the display. Therefore, in order to accurately determine the color representation of a corresponding area of the image that each peripheral device can present, the image can be divided into multiple color extraction regions, and the color extraction regions are used to determine the color(s) presented at the corresponding areas of the image on the display.

When dividing the image, in some embodiments, the display apparatus can be further to perform the following one or more steps when dividing the image into the plurality of color extraction regions:

obtaining the image presented on the display; and according to a preset division rule, dividing the image to obtain the plurality of color extraction regions, where the preset division rule can include a proportion relationship between a color extraction region and the image.

Because the image on the display apparatus generally has multiple colors, extracting the values of the colors of the image on the entire display apparatus to control the color display of one or more peripheral devices will inevitably cause color inconsistency, and it is not helpful to control multiple peripheral devices. Therefore, it is necessary to divide the image into regions. The image presented on the display is acquired, and the image is divided into multiple color extraction regions according to a preset division rule. The preset division rule may be to divide the image according to a ratio relationship between one or more color extraction region and the image. FIG. 9 is a schematic diagram of a color extraction region according to some embodiments. Referring to FIG. 9, if a quarter of the image needs to be acquired, a color extraction region whose image area is ¼ of the whole image area can be extracted in any portion of the image, such as a color picking block P1 shown in FIG. 9, As an embodiment, an area not close to an edge of the display in the image shown on the display may also be captured, such as a color picking block P2 and a color picking block P3 shown in FIG. 10. The color picking block P1, the color picking block P2 and the color picking block P3 can be selected with some overlapping between the multiple color picking blocks, and coordinates for determining each color picking block are calculated by obtaining the resolution of the TV screen of the display apparatus. As another embodiment, the image can also be divided into multiple color extraction regions that do not overlap with each other. The sum of the multiple color extraction regions can be less than or equal to the entire region of the image. As shown in FIG. 11, the image is divided into four color extraction regions that are not overlap with each other, the positions of the four color extraction regions can be located at the upper, lower, left, and right of the image, respectively. The first color picking block A1 is located at the upper portion of the image, and the second color picking block A2 is located at the lower portion of the image, the third color picking block A3 is located at the left portion of the image, and the fourth color picking block A4 is located at the right portion of the image.

In some embodiments, after division of the color extraction regions, a binding or associating relationship between each divided color extraction region and its corresponding peripheral device will be established, and the number of the peripheral devices is the same as the number of the color extraction regions, so that a color extraction region is in a one-to-one binding relationship with a peripheral device, and one peripheral device receives the color of one color extraction region, so that the peripheral device can display the color of the image of the corresponding region, to avoid confusion, and to present the effect that different peripheral devices display different colors.

In some embodiments, after the division of the color extraction regions is completed, a binding relationship between each divided color extraction region and its corresponding peripheral device will be established, and the number of the peripheral devices and the number of the color extraction regions also can be different, one color extraction region can be bound to multiple peripheral devices, or multiple color extraction regions can be bound to one peripheral device, besides a one-to-one binding relationship, so that the multiple peripheral devices can receive one color of the color extraction region, or one peripheral device can receive the colors of multiple color extraction regions, which may be selected according to the actual application scenario, to present the effect that different peripheral devices display different colors according to a preset rule.

When a peripheral device is associated with a color extraction region, by selecting a name of a target peripheral device in the device list, the corresponding peripheral device will be in a flickering state on a user interface, so as to accurately determine that the number of peripheral devices to be bound is one or more. Then, based on the personalized settings of the user, a binding relationship can be established between the flickering peripheral device and the corresponding color extraction region. In order to facilitate the consistency of the color of the image presented by the peripheral device, the binding relationship between the peripheral device and the color extraction region can be established according to a rule similar to the rule for setting division regions.

In some embodiments, the setting region of the peripheral device is bound to the area of the color extraction region, for example, the first peripheral device 201*a* arranged at the upper portion of the display corresponds to the color picking block P1 located at the upper left corner of the image, and at the same time, the peripheral device 201*a* corresponds to the color picking blocks P2 and P3 located at the lower left or upper right portion of the image.

In some embodiments, the position of the peripheral device is in one-to-one correspondence with the position of the color extraction region, for example, the first peripheral device 201*a* arranged at the upper portion of the display corresponds to the first color picking block A1 located at the upper portion of the image, the second peripheral device 201*b* arranged at the lower portion of the display corresponds to the second color picking block A2 located at the lower portion of the image, and the third peripheral device 201*c* arranged at the left side of the display corresponds to the third color picking block A3 located at the left portion of the image, and the fourth peripheral device 201*d* arranged at the right portion of the display corresponds to the fourth color picking block A4 located at the right portion of the image.

S2. Obtaining HSL values of image contents presented in target color extraction regions of the plurality of color extraction regions.

The divided color extraction regions are used to provide colors for corresponding peripheral devices. Therefore, color extraction can be performed on the image content presented in each color extraction region, and the HSL value(s) corresponding to the color extraction region(s) can be determined.

The HSL value is determined by directly extracting from each color extraction region, or by first obtaining an image presented on the current display (for example, a screenshot is taken first) and then extracting the HSL value(s) of each color extraction region from the screenshot.

Figure 10:
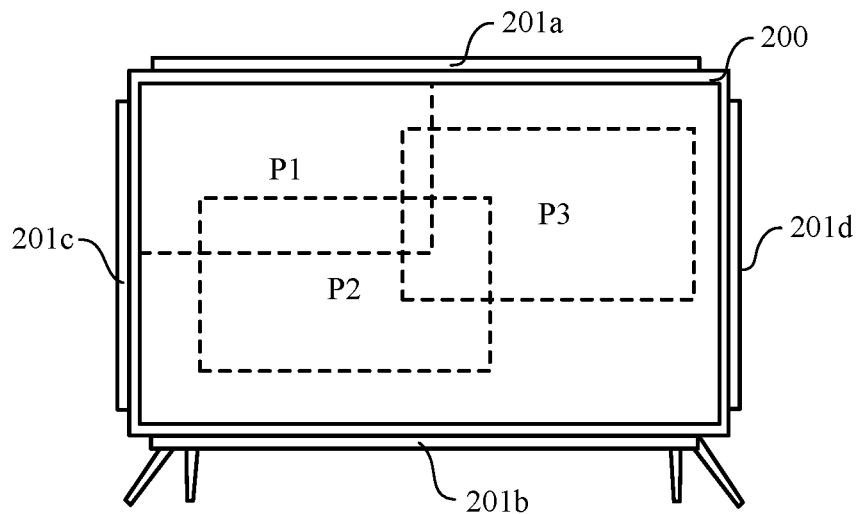
FIG. 10 is a schematic diagram of block division for picking color according to some embodiments of the present disclosure.
Figure 11:
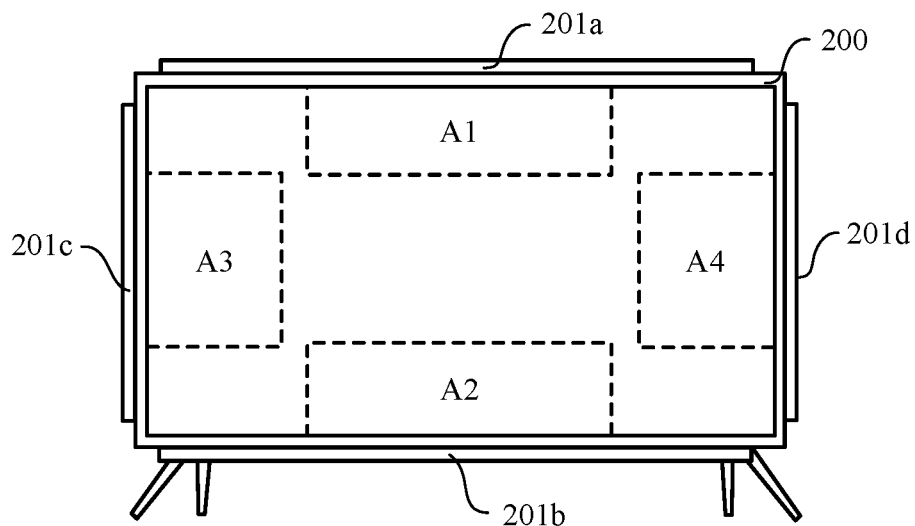
FIG. 11 is a schematic diagram of block division for picking color according to some embodiments of the present disclosure.

A method for extracting color feature values is provided according to some embodiments. In some embodiments, when direct extraction is used, the display apparatus is further configured to perform the following one or more steps when obtaining the HSL values of the image contents presented in the target color extraction regions of the plurality of color extraction regions:

selecting a target color extraction region from the plurality of color extraction regions;

where referring to the division method of the color extraction regions in FIG. 10, in some embodiments, the color picking block P1 can be used as the target color extraction region, or the color picking block P2 can be used as the target color extraction region, or the color picking block P3 can be used as the target color extraction region;

calculating an H channel value, an S channel value and an L channel value of the image content presented on the target color extraction region; and extracting the H channel value, the S channel value and the L channel value as the HSL values corresponding to each target color extraction region.

Since each peripheral device only presents the color(s) of the image content presented in the color extraction region that has a binding relationship with the peripheral device, the display apparatus can directly extract the H channel value, the S channel value and the L channel value of the image content presented in the target color extraction region. The H channel value, the S channel value and the L channel value respectively represent the hue, the saturation, and the lightness under the HSL mode, respectively, and the changes of the three color channels, and the three color channels may be superimposed to obtain a variety of colors.

Among them, the H channel value, i.e., hue, is the basic attribute of the color, which represents the range of colors that can be perceived by the human eyes. These colors can be expressed as distributed on a flat hue circle, which takes a value ranging from a central angle of 0° to a central angle of 360°, and each angle represents a color. The six main colors on the hue circle are 360°/0° red, 60° yellow, 120° green, 180° cyan, 240° blue, and 300° magenta, and they are arranged at intervals of 60° central angle on the hue circle. The S channel value, i.e., saturation, refers to the purity of the color. The higher the saturation, the purer and thicker the color, and the lower the saturation, the greyer and lighter the color. It can be represented by the value ranging from 0% to 100%, the higher the value, the less gray in the color, and the brighter the color. The purity represents the arrangement from black, gray and white to bright, and is given a difference of 0-9 levels. The L channel value, i.e., lightness, refers to the lightness or darkness of the color. The higher the lightness value, the whiter the color, and the lower the lightness, the darker the color. It can be represented by the value ranging from 0% to 100%, and the smaller the value, the darker the color, and the closer it is to black; the larger the value, the brighter the color, and the closer it is to white.

Each target color extraction region can correspond to an HSL value (H, S, L). For example, the HSL value corresponding to the color picking block P1 can be (H1, S1, L1), and the HSL value corresponding to the color picking block P2 can be (H2, S2, L2), and the HSL value corresponding to the color picking block P3 can be (H3, S3, L3).

In some embodiments, the HSL value corresponding to each color picking block is calculated by the following manner.

In some embodiments, the hue H in the HSL value of the color picking block is calculated according to Formula (1).

$$H=\Sigma_{i=1}^{m}(h_i*n_i)/N \qquad \text{Formula (1)}.$$

Wherein, N is the total number of samples taken from the color picking block, which is a positive integer; m is the number of sampling points in the range of the hue circle, which is a positive integer; $h_i$ is the hue value of the $i^{th}$ sampling point, $1 \leq i \leq m$; $n_i$ is the number of a sample having the same hue value as the $i^{th}$ sampling point among the N numbers of samples taken from the color picking block, which is called return value.

In some embodiments, for the calculation of the hue, the total number N of samples in the color picking block P1 is 10000; the value range of the hue value h is defined as 0-360°, within this value range, 8 sampling points (i.e., m=8) are set on the hue circle which represents the hue, i.e. the first to the eighth sampling points, which are respectively sampled at the following 8 angles: $h_1$ corresponding to the first sampling point is 280°, $h_2$ corresponding to the second sampling point is 320°, $h_3$ corresponding to the third sampling point is 0°, $h_4$ corresponding to the fourth sampling point is 40°, $h_5$ corresponding to the fifth sampling point is 80°, $h_6$ corresponding to the sixth sampling point is 120°, $h_7$ corresponding to the seventh sampling point is 180° and $h_8$ corresponding to the eighth sampling point is 240°. The return values of the above sampling points in the color picking block P1 are represented as $n_1$ to $n_8$, where the return values $n_1$ to $n_8$ of the first to eighth sampling points are 1, 20, 9351, 338, 86, 66, 60 and 78, respectively.

Putting the above $h_1$ to $h_8$, $n_1$ to $n_8$, and N=10000 into Formula (1) and calculating as follows:

[(280*1)+(320*20)+(0*9351)+(40*338)+(80*86)+ (120*66)+(180*60)+(240*78)]/10000, the calculated average value is the hue value H1 of the color picking block P1.

When setting the sampling points, it is not necessary to start sampling from 0°, but to start sampling from any angle value on the angle of the hue circle. In some embodiments of the present disclosure, one of the sampling methods is provided, which may be uniform sampling or non-uniform sampling on the angle of the hue circle; and the number of sampling points can also be selected according to needs, which is not specifically limited in the embodiments of the present disclosure.

In some embodiments, the saturation S in the HSL value of the color picking block is calculated according to Formula (2).

$$S=\Sigma_{i=1}^{m}(s_i*n_i)/(s_{max}*N) \qquad \text{Formula (2)}.$$

Among them, N is the total number of samples taken from the color picking block, which is a positive integer; m is the number of sampling points in the saturation range, which is a positive integer; $s_i$ is the saturation value of the $i^{th}$ sampling point, $1 \leq i \leq m$; $n_i$ is the number of a sample that has the same saturation value as the $i^{th}$ sampling point among the N numbers of the samples taken from the color picking block, which is called return value; $s_{max}$ is the upper limit of the saturation range.

In some embodiments, for the calculation of saturation, the total number N of samples in the color picking block P1 is 10000, and the value range of saturation is defined as 0-63, that is, $s_{max}$ is 63, within this value range, 8 sampling points (that is, m=8) are set, namely the first to eighth sampling points, where the saturation values $s_1$-$s_8$ corresponding to the first to eighth sampling points are 2, 9, 17, 25, 33, 41, 51, and 62, respectively. The return values of the sampling points in the color picking block P1 are denoted as $n_1$ to $n_8$, where the return values $n_1$ to $n_8$ of the first to eighth sampling points are 3383, 43, 36, 90, 133, 106, 26 and 6183, respectively.

Putting the above values from $s_1$ to $s_8$, $n_1$ to $n_8$, $s_{max}$=63 and N=10000 into Formula (2) and calculating as follows:

[(2*3383)+(9*43)+(17*36)+(25*90)+(33*133)+ (41*106)+(51*26)+(62*6183)]/(63*10000), the calculated average value is the saturation S1 of the color picking block P1.

When sampling points are set, it is not necessary to take samples according to the method provided by the embodiments of the application. It can be selected according to the actual test operation, and arbitrarily sampled from the value range 0-63. In some embodiments of the present disclosure, one sample manner is given, which can be uniform sampling or non-uniform sampling within the value range of 0-63; the number of sampling points can also be selected according to actual needs, and there is no specific limitation in the embodiments of the present disclosure.

In some embodiments, the lightness L in the HSL value of the color picking block is calculated according to Formula (3).

$$L=\Sigma_{i=0}^{m}(l_i*n_i)/(l_{max}*N) \qquad \text{Formula (3)}.$$

Among them, N is the total number of samples taken from the color picking block, which is a positive integer; m is the number of sampling points in the lightness range, which is a positive integer; $l_i$ is the lightness value of the $i^{th}$ sampling point, $1 \leq i \leq m$; $n_i$ is the number of samples having the same lightness value as the $i^{th}$ sampling point among the N numbers of samples in the color picking block, which is called return value; $l_{max}$ is the upper limit of the lightness range.

In some embodiments, for the calculation of lightness, the total number N of samples in the color picking block P1 is 10000, and the value of the data list, i.e. au2LumaHist, for obtaining the L channel value is used for calculation, and the lightness range is defined as 0-255, that is, the $l_{max}$ is 255, and uniformly sampling is performed within this value range, 32 sampling points (that is, m=32) are set to be evenly distributed, the lightness of the color picking block is calculated based on Formula (3) by using the lightness value of each sampling point and its return value in the color picking block P1, and the calculated average value is the lightness L1 of the color picking block P1.

Similarly, H2, S2, and L2 of the color picking block P2, and H3, S3, and L3 of the color picking block P3 can be calculated according to the above manner. Therefore, it can be obtained that the HSL value corresponding to the color picking block P1 is (H1, S1, L1), the HSL value corresponding to the color picking block P2 is (H2, S2, L2), and the HSL value corresponding to the color picking block P3 is (H3, S3, L3).

S3. Sending the HSL value of each target color extraction region to a peripheral device bound with the target color extraction region, to cause the peripheral device to present a color corresponding to the HSL value.

After the HSL value of each color extraction region is determined, the HSL value can be sent to the corresponding peripheral device for display. Each color extraction region has a corresponding binding relationship with the peripheral device, therefore, the display apparatus can send the HSL value of each color extraction region to the corresponding peripheral device based on the binding relationship.

In some embodiments, if the peripheral device supports a color rendering based on the HSL value, the HSL value of each target color extraction region is directly sent to the peripheral device.

For example, the HSL value (H1, S1, L1) corresponding to the first color picking block P1 is sent to the first peripheral device 201a, and the first peripheral device 201a presents the color corresponding to the HSL value (H1, S1, L1). The HSL value (H2, S2, L2) corresponding to the second color picking block P2 is sent to the second peripheral device 201b, and the second peripheral device 201b presents the color corresponding to the HSL value (H2, S2, L2). The HSL value (H3, S3, L3) corresponding to the third color picking block P3 is sent to the third peripheral device 201c, and the third peripheral device 201c presents the color corresponding to the HSL value (H3, S3, L3).

If one color picking block corresponds to multiple peripheral devices, then the HSL value of the one color picking block is sent to multiple peripheral devices, for example, the HSL value (H1, S1, L1) corresponding to the color picking block P1 is sent to the first peripheral device 201a, at the same time, the HSL value (H1, S1, L1) corresponding to the color picking block P1 is sent to the second peripheral device 201b.

In some embodiments, if the peripheral device does not support color rendering based on the HSL value, the HSL value of each target color extraction region is converted into RGB value, and then the RGB value is sent to the peripheral device.

Converting the HSL value to the RGB value is known in the art, and details are not described in the embodiments of the present disclosure.

When the display apparatus sends the RGB mean value to the corresponding peripheral device, the RGB mean value can be first packaged into a network packet for sending.

The peripheral device receives and analyzes the network packet to obtain corresponding color value(s), and displays the color value to change the display color of the peripheral device.

In some embodiments, the display apparatus acquires the HSL value of the specified color extraction region every 100 milliseconds, and then the peripheral device displays the color corresponding to the HSL value, so that the color displayed by the screen of the display apparatus and the peripheral device together presents a gradient color effect, as such, the display color of the screen and the peripheral device can be displayed synchronously, and the display color of the peripheral device can change with the color change of the screen of the display apparatus.

In some embodiments according to the present disclosure, a display apparatus and a control method thereof are provided. The display apparatus can include a display; one or more interfaces; at least one processor connected with the display and the one or more interfaces, the at least one process controls the display apparatus to connect with one or more peripheral devices through the one or more interfaces, and the one or more peripheral devices are configured to present different colors; and the colors of the image on the display of the display apparatus are synchronized to the one or more peripheral devices by regions. In order to synchronize the colors of the image in the display to the one or more peripheral devices by regions, the display apparatus divides the image into a plurality of color extraction regions, and obtains HSL values of image contents of target color extraction regions of the plurality of color extraction regions; and sends the HSL value of each target color extraction region to a peripheral device bound with the target color extraction region, so that the peripheral device can present the color corresponding to the HSL value. Obtaining the color value through the method described in the embodiments of the present disclosure can control the lightness of the peripheral device, and the performance is better, which can address the problem of the accuracy of displaying the extracted color in the peripheral device in the related art, and the problem of whether the color change of the peripheral device is related to the image in the display apparatus.

According to some embodiments of the present disclosure, the display apparatus can serve as a standard Bluetooth device, which can be scanned by external devices (such as various other Bluetooth devices) or scan external devices for pairing and connection. However, currently there are some Bluetooth devices capable of actively initiating a connection with a device supporting Bluetooth technology, such as a display apparatus. When these Bluetooth devices initiate a connection request, the display apparatus will pop up information prompt for Bluetooth pairing connection. If the display apparatus has been connected with a Bluetooth device, or is currently playing content, etc., this information prompt will interfere with the content normally played by the display apparatus, and will also affect the user experience.

According to some embodiments of the present disclosure, a display apparatus and a method capable of preventing interference of a Bluetooth device are also provided, so as to address the problem that an unpaired Bluetooth device interferes with normal use of the display apparatus.

Figure 12:
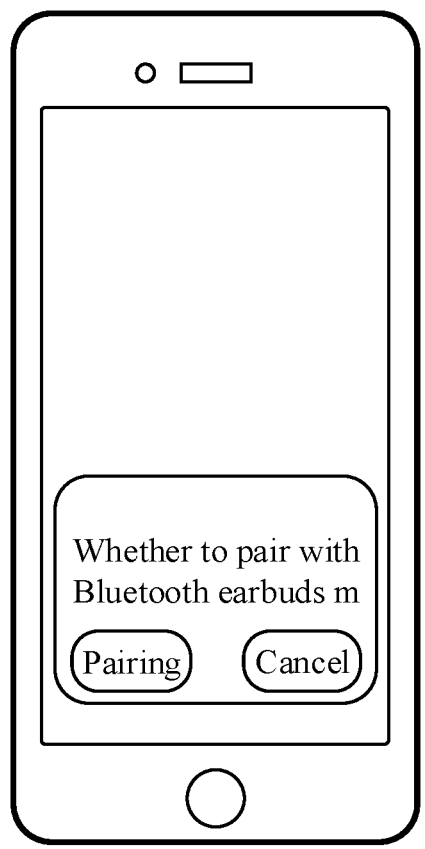
FIG. 12 is a schematic diagram of a pairing prompt page displayed on a mobile phone according to some embodiments of the present disclosure.

Taking the display apparatus 200 as a mobile phone and the Bluetooth device as Bluetooth earbuds as an example, if the Bluetooth earbuds m scan the mobile phone of an user, it will immediately and actively send a pairing request to the mobile phone. As shown in FIG. 12, after the mobile phone receives the pairing request, a pairing prompt page will pop up on the current display content, including the prompt "whether to pair with the Bluetooth earbuds m" and "pairing", "cancel" and other controls. If the mobile phone has been connected with the user's own Bluetooth earbuds, and the user does not want to change to the Bluetooth earbuds m, then the pairing prompt page currently displayed on the mobile phone will affect the content that the user is currently watching.

In order to solve the above-mentioned interference problem of the unpaired Bluetooth device on the display apparatus 200, the display apparatus 200 in the embodiments of the present disclosure can provide a Bluetooth visibility switch. When the user does not want the display apparatus 200 to connect with a Bluetooth device, the Bluetooth visibility switch can be turned off. Alternatively, when the display apparatus 200 has been connected with a Bluetooth device, and the user does not want other Bluetooth devices to connect with the display apparatus 200, the Bluetooth visibility switch can be turned off. When the Bluetooth visibility switch is turned off, the display apparatus 200 can not be scanned by the Bluetooth device, and the Bluetooth device will not actively send a pairing request to the display apparatus 200. In this way, the display apparatus 200 can be used normally or display content without being disturbed by the pairing prompt of the Bluetooth device.

In some embodiments of the present disclosure, the display apparatus 200 may have a Bluetooth component and a WiFi component built in, where the Bluetooth component has a Bluetooth connection function and is used to establish a Bluetooth connection with other devices; and the WiFi component is used to establish a WiFi® connection, specifically for a mobile terminal (for example, a Bluetooth® device) to establish a socket connection within the same local area network. The socket connection is one of the connection modes of WiFi connection, which can transmit a larger amount of data than that of Bluetooth transmission.

After the display apparatus 200 is turned on for the first time or restored to the factory default settings, it will be turned on the Bluetooth function and display a navigation configuration interface. In some embodiments of present disclosure, the first boot command refers to the first boot command after the display apparatus 200 leaves the factory or the first boot command after restoring to factory default settings.

In some embodiments of the present disclosure, the display apparatus 200 automatically turns on the Bluetooth function after responding to the first boot command, and the Bluetooth state of the display apparatus 200 is switched from a standby state to an advertising state, and a broadcast packet carrying manufacturer information and connection mode of the display apparatus 200 is sent via the broadcasting manner.

In some embodiments, the format of the broadcast packet sent from the display apparatus 200 can include a valid data part (i.e. significant part) and an invalid data part (i.e. non-significant part), where the valid data part can include N number of AD structures, the format of each AD structure is: Length|AD Type (data type)|AD data. For example, in some embodiments of the present disclosure, the defined data type is 05ff, and the data is "5d 00 04 00", indicating the carried manufacturer information and connection mode.

The display apparatus 200 continuously sends broadcast packets according to the format of the above broadcast packets. The display apparatus 200 continuously sends broadcast packets (that is, broadcast data) at broadcast intervals. The Bluetooth device enters the scanning state, sends a scanning request, and continuously monitors a broadcast packet in the environment. When the broadcast packet is monitored (that is, the scan response sent by the display apparatus 200 is received), after confirming the manufacturer information and connection mode by parsing the contents in the broadcast packet (that is, the broadcast packet carried by the scan response), the display apparatus 200 that needs to be connected with Bluetooth is determined according to the manufacturer information, and a Bluetooth connection request is sent to the display apparatus 200 according to the connection mode, and after the display apparatus 200 receives the Bluetooth connection request, a Bluetooth connection corresponding to the connection mode is established.

In some embodiments, the Bluetooth device sends a device discovery broadcast to search for nearby devices with the Bluetooth function enabled by distributing broadcast messages. After receiving the broadcast message from the Bluetooth device, the display apparatus 200 responds to the device discovery broadcast and sends response information to the Bluetooth device. The response message indicates whether the display apparatus 200 supports control via the Bluetooth device.

Regarding the setting process of the Bluetooth visibility switch, the display apparatus 200 according to some embodiments may be configured to: generate a Bluetooth switch instruction in response to a selection on a Bluetooth setting page of the display apparatus; control a state of the Bluetooth visibility switch in response to the Bluetooth switch instruction; control the display apparatus to be in a state that cannot be scanned in response to a state of the Bluetooth visibility switch being off, so that the display apparatus can not be scanned by a Bluetooth device; and in response to the Bluetooth visibility switch being turned on, control the display apparatus to be in a state that can be scanned, so that the display apparatus can be scanned by a Bluetooth device.

In the display apparatus 200 according to the embodiments of the present disclosure, the Bluetooth visibility switch can be displayed on the Bluetooth setting page. In order to prevent the Bluetooth device from interfering with the display apparatus 200, the user can set the Bluetooth visibility switch to be off in the Bluetooth setting page, and in response to the user's settings, the display apparatus 200 invokes a Bluetooth visibility off program to turn off the Bluetooth visibility switch, so that the display apparatus 200 will not be scanned by a Bluetooth device. In some embodiments, in the Bluetooth setting page, the Bluetooth visibility switch can be specifically displayed as a switch control that can move left and right. When the switch control moves to the right, it indicates that the Bluetooth visibility switch is turned on; when the switch control moves to the left, it indicates that the Bluetooth visibility switch is turned off.

In the foregoing embodiments, the user can set the display apparatus 200 through a physical remote controller or a virtual remote controller, such as pressing the direction key to control the movement of a focus on the page of the display apparatus 200, pressing the confirmation key to select the option or content, etc., where the focus is located. The user may also speak to the display apparatus 200 capable of providing a voice service, and then input a command to the display apparatus 200, for example, inputting a voice content of "open the Bluetooth setting page" and the like.

If the user needs the display apparatus 200 to connect with a Bluetooth device, or needs to connect the display apparatus 200 with another Bluetooth device, the user can turn on the Bluetooth visibility switch. The user can set the Bluetooth visibility switch to be turned on at the Bluetooth setting page, and the display apparatus 200 calls a Bluetooth visibility enabling program to turn on the Bluetooth visibility switch in response to the user's setting, so that the display apparatus 200 can be scanned by the Bluetooth device. When the Bluetooth visibility switch is turned on, the display apparatus 200 is in the state that can be scanned, so that it can be scanned by the Bluetooth device, and then the Bluetooth device will actively send a pairing request to the display apparatus 200. In this way, the user can control the display apparatus 200 to connect with a target Bluetooth device according to their own needs.

After the Bluetooth visibility switch is turned on, the Bluetooth device that can scan the display apparatus 200 may be a Bluetooth device that has been paired with the display apparatus 200, or may be Bluetooth devices that have not been paired with the display apparatus 200.

For the Bluetooth device that has been paired with the display apparatus 200, the display apparatus 200 has stored device information of the Bluetooth device, and the Bluetooth device has also stored device information of the display apparatus 200. Therefore, after the Bluetooth device scans the display apparatus 200, it does not need to send a pairing request to the display apparatus 200 again, but can directly send a connection request. The display apparatus 200 is directly connected with the Bluetooth device according to the connection request.

In the above process of connecting the display apparatus 200 with the paired Bluetooth device, the display apparatus 200 may be configured to: firstly, in response to turning on the Bluetooth visibility switch, control the display apparatus 200 to receive a connection request sent from the paired Bluetooth device; and in response to the connection request, control the display apparatus 200 to connect with the paired Bluetooth device. For a Bluetooth device that has not been paired, since the display apparatus 200 has not stored device information of the Bluetooth device, the Bluetooth device also has not stored device information of the display apparatus 200, so when the unpaired Bluetooth device scans the display apparatus 200, it needs to send a pairing request to the display apparatus 200 first. After the display apparatus 200 agrees to pair with the unpaired Bluetooth device, the unpaired Bluetooth device can be paired with the display apparatus 200 for connection.

Figure 13:
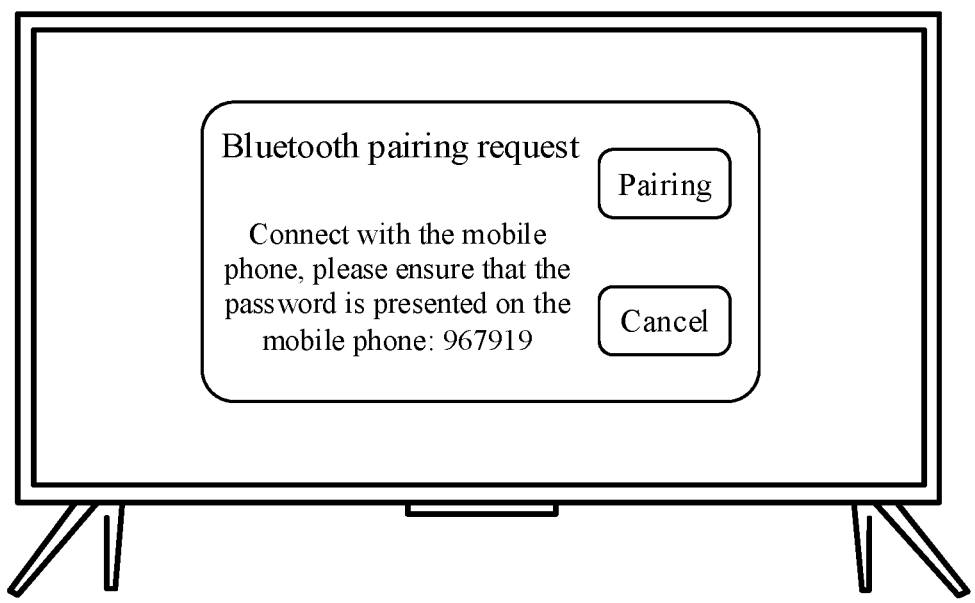
FIG. 13 is a schematic diagram of a pairing prompt page according to some embodiments of the present disclosure.

In some embodiments, after the unpaired Bluetooth device sends the pairing request to the display apparatus 200, the display apparatus 200 will not actively pair with the unpaired Bluetooth device, but will display a pairing prompt page to prompt the user whether the display apparatus 200 needs to pair with the unpaired Bluetooth device. Referring to FIG. 13, FIG. 13 is a schematic diagram of a pairing prompt page according to some embodiments. In the pairing prompt page, the prompts such as "Bluetooth pairing request" and "connect with the mobile phone, please ensure that the password is displayed on the mobile phone: 967919" are displayed, and options such as "pairing" and "cancel" are also displayed. If the user confirms that the pairing password displayed on the mobile phone to be paired is: 967919, the user can select the "pairing" option, thereby inputting a pairing instruction to the display apparatus 200 to control the display apparatus 200 to pair with the mobile phone.

Usually, after the display apparatus 200 is paired with the unpaired Bluetooth device, it can immediately connect with the unpaired Bluetooth device. At this point, the unpaired Bluetooth device will become a paired Bluetooth device.

After the display apparatus 200 displays the pairing prompt page, if the user finds that the pairing password displayed on the mobile phone is wrong, or does not want to pair with the mobile phone, the user can also select the "cancel" option, thereby inputting a cancel command to the display apparatus 200, and the display apparatus 200 is controlled to continue display normal content. In this case, the display apparatus 200 still maintains a current Bluetooth connection state, and will not be paired with the mobile phone.

During the connection process between the display apparatus 200 and the unpaired Bluetooth device, the display apparatus 200 may also be configured to: in response to turning on the Bluetooth visibility switch, control the display apparatus 200 to receive the pairing request sent from the unpaired Bluetooth device; in response to the pairing request, control the display 260 to display a pairing prompt page to prompt the user to pair the display apparatus 200 with the unpaired Bluetooth device; in response to the user's selection of the option "pairing" on the pairing prompt page, generate a pairing instruction, in response to the pairing instruction, control the display apparatus 200 to pair with the unpaired Bluetooth device; and upon completion of the pairing, control the display apparatus 200 to connect with the paired Bluetooth device.

Figure 14:
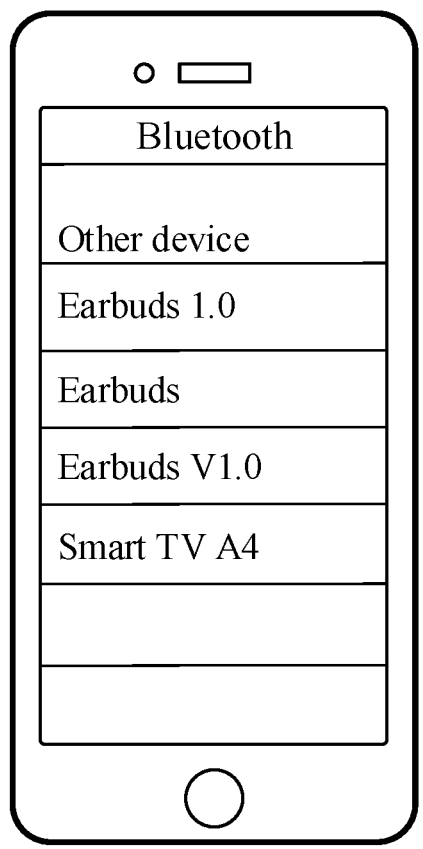
FIG. 14 is a schematic diagram of a list of Bluetooth devices on a mobile phone according to some embodiments of the present disclosure.

In the above-mentioned embodiments, the unpaired Bluetooth device actively sends a pairing request to the display apparatus 200 as an example to describe the method in the embodiments of the present disclosure. In some embodiments, a pairing request may also be passively sent to the display apparatus 200 by the user operating an unpaired Bluetooth device. For example, after turning on the Bluetooth function of some mobile phones, many devices including the display apparatus 200 can be scanned. In this case, as shown in FIG. 14, the names of all scanned devices will be displayed on the Bluetooth device list of the mobile phone. The name of the display apparatus 200 may be "Smart TV A4". If it is desired to connect the mobile phone with the display apparatus 200, the user can select "Smart TV A4" on the Bluetooth device list, and in this case, the mobile phone will send a pairing request to the display apparatus 200. After receiving the pairing request, the display apparatus 200 displays a pairing prompt page.

In order to avoid too complicated operations every time a paired Bluetooth device is connected to the display apparatus 200, device information of the paired Bluetooth device may be stored in the display apparatus 200. If the display apparatus 200 is not currently connected to any Bluetooth device and is in the state that can be scanned, it will preferentially connect with the paired Bluetooth device, and there is no need to pair with the Bluetooth device again when connecting.

For example, a Bluetooth device A, a Bluetooth device B and a Bluetooth device C can all scan the display apparatus 200, but only the Bluetooth device B has been paired with the display apparatus 200, then if the Bluetooth device A, the Bluetooth device B and the Bluetooth device C are all having sent a corresponding pairing request and a connection request, the display apparatus 200 can connect with the Bluetooth device B in response to the connection request sent from the Bluetooth device B. If the user does not want to be disturbed by pairing requests from other Bluetooth devices, the Bluetooth visibility switch can be set to off. After connecting with the Bluetooth device B, if the user wants to connect the display apparatus with the Bluetooth device A, the display apparatus 200 can be operated to actively scan and select the scanned Bluetooth device A to pair with itself, and directly connect with the Bluetooth device A after pairing.

When multiple paired Bluetooth devices can scan the display apparatus 200, in order to avoid connection conflicts among the paired Bluetooth devices, the display apparatus 200 may determine the last connected paired Bluetooth device and connect to the paired Bluetooth device.

For example, a paired Bluetooth device a, a paired Bluetooth device b and a paired Bluetooth device c all can scan the display apparatus 200 and send a connection request to the display apparatus 200, and the display apparatus 200 determines that the last Bluetooth device connected with it among the three paired Bluetooth devices is the paired Bluetooth device c. Then the display apparatus 200 can preferentially connect with the paired Bluetooth device c. After connecting with the Bluetooth device b, if the user wants to connect the display apparatus with the Bluetooth device a, the paired Bluetooth device a can be selected from the Bluetooth device list provided by the display apparatus 200 for connection.

Figure 15:
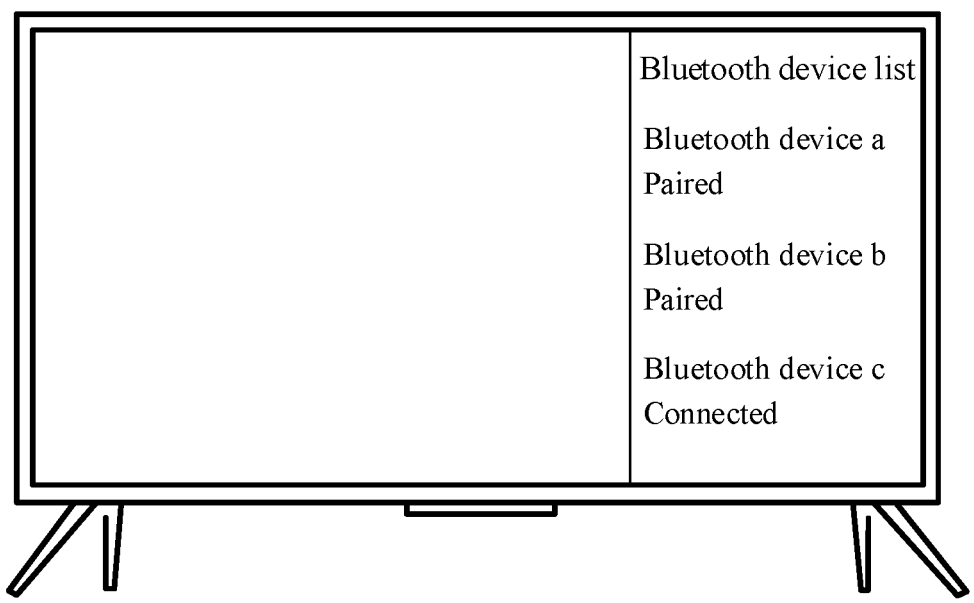
FIG. 15 is a schematic diagram of a Bluetooth device list of the display apparatus 200 according to some embodiments of the present disclosure.

Referring to FIG. 15, FIG. 15 is a schematic diagram of a Bluetooth device list of the display apparatus 200 according to some embodiments. Taking the paired Bluetooth device a, the paired Bluetooth device b, and the paired Bluetooth device c that can scan the display apparatus 200 as an example, the Bluetooth device list of the display apparatus 200 can display the name of the paired Bluetooth device a, the name of paired Bluetooth device b, and the name of the paired Bluetooth device c. If the display apparatus 200 is in the state of being connected with the paired Bluetooth device c, then a "connected" prompt will be displayed near the position of the Bluetooth device c in the Bluetooth device list, and a "paired" prompt will be displayed near the locations of the Bluetooth device a and the Bluetooth device b. If the user wants to connect the display apparatus with the paired Bluetooth device a, then the user can select the Bluetooth device a in the Bluetooth device list. After the connection, a "connected" prompt will be displayed near the location of the Bluetooth device a, and correspondingly, a "paired" prompt will be displayed near the location of the Bluetooth device c.

In some embodiments, in order to avoid multiple operations from the user on the Bluetooth visibility switch of the display apparatus 200, the display apparatus 200 may also save the Bluetooth visibility state before each shutdown of the display apparatus. In this way, when the display apparatus is turned on again, the display apparatus 200 can restore the Bluetooth visibility state before the shutdown, so as to prevent the user from repeating settings and operations many times.

In order to realize the above-mentioned process for the display apparatus 200 to restore the Bluetooth visibility state before shutdown, the display apparatus 200 may also be configured to: save a current state of the Bluetooth visibility switch as a saved state of the Bluetooth visibility switch; and in response to the display apparatus 200 being turned on, obtain the saved state of the Bluetooth visibility switch as the current state of the Bluetooth visibility switch. The current state of the Bluetooth visibility switch may be saved at any time after the state of the Bluetooth visibility switch is set. The display apparatus 200 in the embodiments of the present disclosure may firstly present the Bluetooth setting page according to the user's operation. If the display apparatus 200 is currently connected to a certain Bluetooth device, in order to prevent other unpaired Bluetooth devices from interfering with the display apparatus 200 being currently in normal use, the user can turn off the Bluetooth visibility switch in the Bluetooth setting page, after it is turned off, the currently connected Bluetooth device will not be affected, and other unpaired Bluetooth devices cannot scan the display apparatus 200 or send a pairing request to the display apparatus 200, thereby preventing the display apparatus 200 from displaying the request information of the unpaired Bluetooth device and interfering with normally displayed content.

The traditional process of pairing a display apparatus with an external device is cumbersome, and the user needs multiple operations, such as starting the Bluetooth, manually performing a Bluetooth search in the user interface, manually selecting a target pairing device from the list, manually entering Bluetooth adaptation codes; and when a Bluetooth device such as a remote controller is displayed as a hardware code in the scanned device list but does not display the device type name, it is difficult for the user to identify the target pairing device among many devices that have been scanned, resulting in some users being unable to realize the pairing connection of the Bluetooth system of the remote controller.

According to some embodiments of the present disclosure, a display apparatus and a method capable of quickly pairing with an external device are further provided.

The embodiments of the present disclosure can be applied to various types of display apparatuses (including but not limited to: a television, a set-top box, etc.), and corresponding external devices, including a Bluetooth external device, an infrared external device, or other wireless external devices. The following will take the control scheme and the user interface for fast pairing of a TV with an external control device such as a Bluetooth remote controller as an example to illustrate a display apparatus and a control method for quickly pairing with an external device.

Figure 16A:
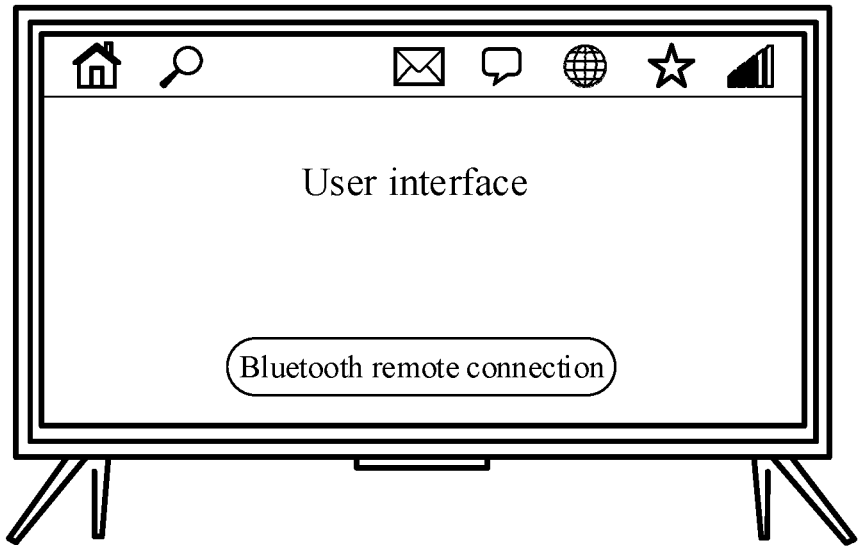
FIG. 16A is a schematic diagram of a user interface for pairing a display apparatus with an external control device according to some embodiments of the present disclosure.

FIG. 16A is a schematic diagram of a user interface for pairing a display apparatus with an external control device according to some embodiments.

In some embodiments, the TV receives a pairing instruction (also referred to as a pairing request) from an external Bluetooth remote controller when the TV is turned on. The pairing instruction can be triggered, for example, by long pressing a MENU key of the remote controller, or long pressing a specific key.

It can be understood that under a normal circumstance, the user can normally press the MENU key to realize the menu display function in the TV user interface, and when the long pressing time exceeds a preset duration threshold, for example, long pressing the MENU key for more than 5 seconds, the instruction from the remote controller will be recognized by the TV as a pairing instruction or an unpairing instruction (also called a unpairing request).

In some embodiments, the user long presses the MENU key or the specific key, and after receiving the instruction from the remote controller, the TV will monitor the broadcast packet from the remote controller to determine the current connection state between the TV and the Bluetooth system of the remote controller; If no pairing relationship has been established between the remote controller and the TV, a pairing process is triggered; if it is determined that the remote controller has been paired with the TV, a process of unpairing the remote controller is triggered.

In some embodiments, when the TV is not paired with the remote controller, the TV will automatically pair and connect to the external Bluetooth remote controller based on the pairing instruction received without other operations of the user.

For example, in any user interface of the TV, the user long presses the "Menu" key of the Bluetooth system of the remote controller; then the user can view the prompt information at the bottom of the user interface of the TV; the TV starts to connect and displays the prompt information of "Bluetooth remote connection" after receiving the information of long pressing "Menu" on the remote controller. After the remote controller is paired and connected with the TV, if the pairing is successful, the prompt information on the user interface of the TV can be changed to information (not shown) for prompting the user that "pairing is successful"; if the pairing fails, then the prompt information on the user interface of the TV may be changed to information (not shown) for prompting the user that "Bluetooth remote unpaired".

Compared with the traditional pairing connection between an external device and a TV, the present disclosure completes all connection actions in the background, and only needs the user to trigger a specific operation, and all operations can be completed in the background. After the external Bluetooth remote controller has been paired to the TV, the user interface of the TV is controlled to display the pairing success information, and no longer display the Bluetooth startup interface. The user does not need to manually turn on the Bluetooth, and does not need to manually control the search for nearby Bluetooth devices, nor does it need to select and pair the searched Bluetooth devices. There is no need to record an adaptation code and enter the adaptation code. After the Bluetooth system of the remote controller is paired successfully, the user interface can display concise prompt information "pairing successful".

In some embodiments, after the user controls the remote controller to issue a pairing instruction, the at least processor can control the user interface to display pairing connection information, for example, it can be displayed as prompt information "Bluetooth remote connection . . . " as shown in FIG. 16A, to remind the user that the remote controller pairing instruction issued by the TV has started to execute the corresponding instruction, avoiding repetitive operations; before the pairing success information is displayed, the user only needs to wait without other operations. Similarly, when the Bluetooth system of the remote controller fails to pair with the TV, the at least processor will control the user interface to display information indicating the pairing failure, such as "Bluetooth remote unpaired".

In some embodiments, after the Bluetooth system of the remote controller is paired with the TV, the user sends an unpairing instruction by long pressing the MENU key. After the TV receives the unpairing instruction sent from the Bluetooth system of the remote controller, the at least processor will control the TV to automatically unpair the paired Bluetooth remote controller without other operations from the user.

After the Bluetooth system of the remote controller is unpaired from the TV, the at least processor will control the user interface to display unpaired information, and for example, the prompt information can be displayed as "Bluetooth remote unpaired". During the unpairing process of the Bluetooth system of the remote controller, the user interface will still not have other space display that requires user operation and interaction, so as to reduce user's operations, make the remote controller pairing and unpairing operation interface more concise, and improve the convenience of the operations of pairing and unpairing.

Figure 16B:
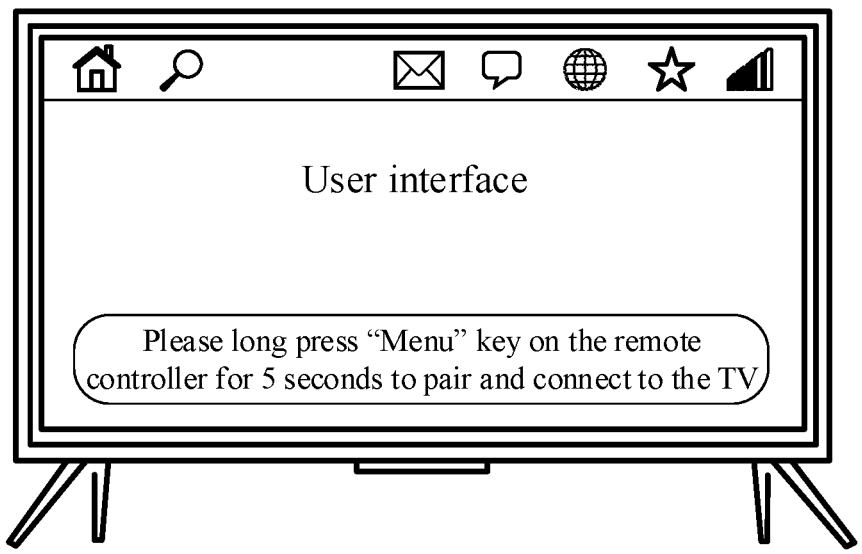
FIG. 16B is a schematic diagram of a user interface for pairing a display apparatus with an external control device according to some embodiments of the present disclosure.

FIG. 16B shows a schematic diagram of a user interface for pairing a display apparatus with an external control device according to other embodiments of the present disclosure.

In some embodiments, the remote controller can be configured to support the Bluetooth and infrared functions at the same time. The realization of conventional functions such as changing channels and adjusting volume can be realized through the speed and control distance of the infrared function of the remote controller; while the remote controller can operate the TV through a voice command. As the amount of data transmitted between the display apparatus and the remote controller becomes larger, the Bluetooth function of the remote controller with higher transmission rate, faster response and longer control distance is required.

When the infrared function of the remote controller has established a connection with the display apparatus but the Bluetooth function has not established connection, the user sends a function instruction that requires data transmission via the Bluetooth to the TV through the remote controller; the at least processor of the TV receives the function instruction sent from the remote controller, and the user interface is controlled to present prompt information for prompting the user to send the pairing instruction method according to the function instruction, so as to help the user complete the pairing between the Bluetooth system of the remote controller and that of the TV. The function instruction can be implemented as pressing a voice key, which can be used to send a voice command to control the TV to search for programs. The command sent after the voice key of the remote controller is pressed may have trigger effects and function implementations. Before the Bluetooth system of the remote controller is paired with the TV, the voice key is used to enable the display apparatus to realize its voice key triggering effect, i.e., to present the prompt information for helping the user to pair the Bluetooth system of the remote controller with that of the TV. After the Bluetooth system of the remote controller is paired with that of the TV, the command sent after pressing the voice key on the remote controller is used to cause the TV to realize the voice command function corresponding to the voice key.

For example, when the Bluetooth system of the remote controller is not connected to the TV, the user presses the "Voice" key on the remote controller, and the TV detects that the remote controller is not connected according to Bluetooth protocol, and will control the user interface to present the prompt information of "Please long pressing the "Menu" key on the remote controller for 5 seconds to pair and connect to the TV", as shown in FIG. 16B.

In some embodiments, the remote controller can work both infrared mode and Bluetooth mode to ensure that the remote controller can be used under any circumstances. The user long presses the "Menu" key to send a broadcast packet to the TV, to trigger the pairing and unpairing processes; after the TV receives a pairing broadcast packet, the at least processor will determine the connection state between the TV and the remote controller; when the connection state of the remote controller is connected according to Bluetooth protocol, the display apparatus will trigger the unpairing process of the Bluetooth system of the remote controller with the display apparatus; when the connection state of the remote controller is not connected according to Bluetooth protocol, the display apparatus will trigger the pairing and connection process of the Bluetooth system of the remote controller with the display apparatus; after the pairing state of the Bluetooth system of the remote controller changes, the user interface will immediately show the user a prompt of a change in the connection state of the Bluetooth system of the remote controller.

It can be understood that the extremely simplified pairing and connection operations of the Bluetooth system of the remote controller can be realized through the above embodiments; in any interface, the user only needs to long press a specific key to trigger the fast pairing and unpairing of the Bluetooth system of the remote controller, and according to the current connection state of the Bluetooth peripheral device, the specific process of pairing and unpairing will be automatically started by the TV, and at the same time, the results of pairing and unpairing are displayed to the user in real time. This method is not only convenient, simple, and efficient, but also can enhance the intelligence of the product, improve the interactive experience of the product, and thus enhance the competitiveness of the product.

Figure 16C:
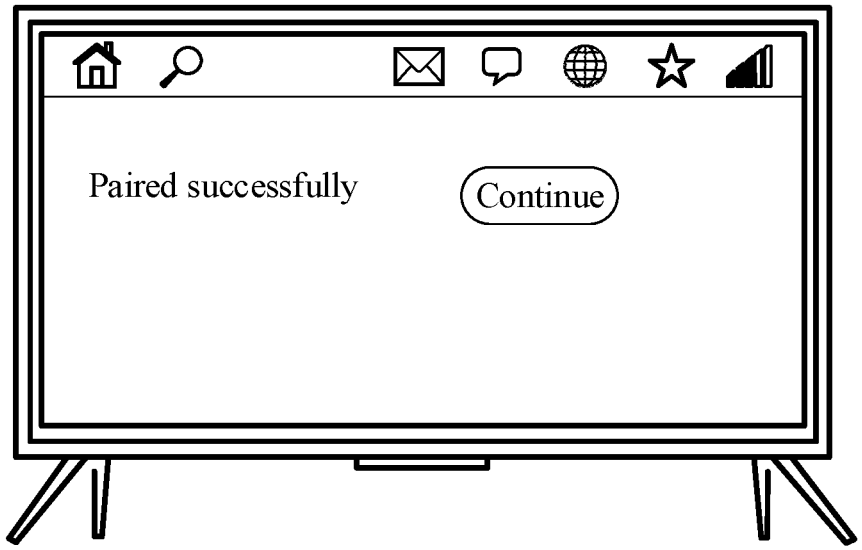
FIG. 16C is a schematic diagram of a user interface for pairing a display apparatus with an external control device according to some embodiments of the present disclosure.
Figure 16D:
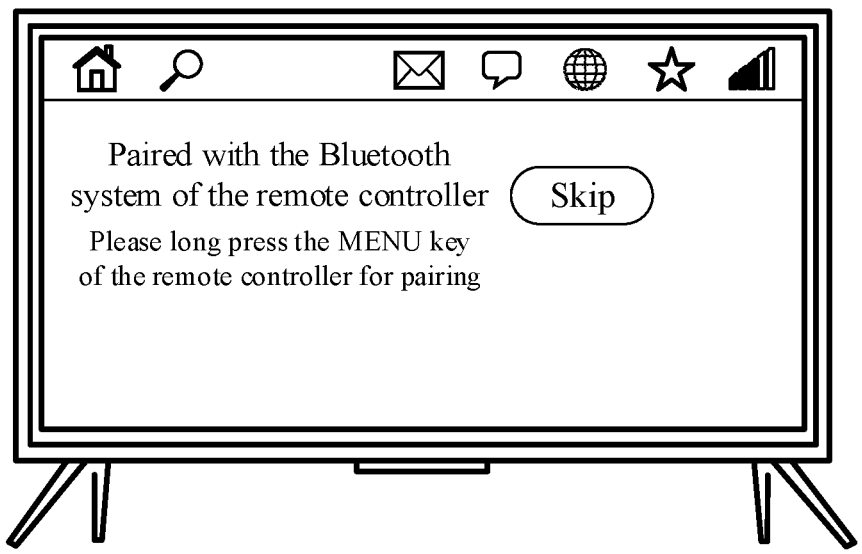
FIG. 16D is a schematic diagram of a user interface for pairing a display apparatus with an external control device according to some embodiments of the present disclosure.

FIG. 16C shows a schematic diagram of a user interface for pairing a display apparatus with an external control device according to other embodiments of the present disclosure.

In some embodiments, the display apparatus according to the present disclosure further provides a navigation function for quick pairing with an external device, and the display apparatus controls the user interface to present a navigation interface for pairing the external device with the display apparatus, as shown in FIG. 16C. Through the simple user interface, the user is prompted to pair the remote controller by long pressing the MENU key of the remote controller, and the navigation interface further can include a control which is variable. If the display is skipped, it means that the TV can skip the Bluetooth remote pairing process after the "Skip" key is selected by the user.

For example, after the TV is used for the first time or the display apparatus is reset, the user interface will present a navigation interface as shown in FIG. 16C; in the illustrated navigation interface, the prompt information can be displayed to prompt the user to pair the Bluetooth system of the remote controller and the specific pairing method; the user can select "Skip" to ignore the pairing of the Bluetooth system of the remote controller; after the user successfully pairs the Bluetooth system of the remote controller according to the prompt information, the at least processor monitors the connection state of the remote controller change to connected state through the page. The "Skip" key will automatically transform into a "Continue" key, and the prompt information will be changed to display information indicating that the pairing of the Bluetooth system of the remote controller is successful.

It can be understood that before the external device is successfully paired, the control in the user interface is displayed as the first key for cancelling the pairing operation; after the external device is successfully paired, the control is displayed as the second key for skipping to other function configuration interfaces, for example displayed as a "Continue" key, as shown in FIG. 16C.

Through this method, the user can quickly and conveniently realize the pairing and unpairing of the Bluetooth system of the remote controller, giving the user an intuitive state prompt without cumbersome connection operations; at the same time, when using the Bluetooth button on the remote controller, it will provide the user with the specific operation method, which is convenient for users to quickly use the Bluetooth system of the remote controller and improve the user experience.

The present disclosure provides a display apparatus and a control method for quickly pairing with an external device. The display apparatus can include a display and at least processor connected with the display, the display apparatus is configured to: receive an operation request from an external device; in response to the operation request, make the display apparatus automatically perform a corresponding operation without other operations from the user; where the operation request can include a pairing request and an unpairing request, the display apparatus is automatically paired and connected with the external device in response to the pairing request, and the display apparatus is automatically unpaired with the external device in response to the unpairing request. In some embodiments, the operation request is generated by long pressing a specific key on the external device, and the display apparatus is further configured to: in response to receipt of the operation request, determine whether the display apparatus is paired and connected with the external device; in response to determining that the display apparatus is not paired and connected with the external device, use the operation request as the pairing request to automatically pair and connect with the external device; and in response to determining that the display apparatus and the external device have been paired and connected, use the operation request as the unpairing request to automatically unpair with the external device.

In some embodiments, the display apparatus is further configured to: receive a function instruction from the external device; determine whether the display apparatus is paired and connected with the external device; in response to determining that the display apparatus is not paired and connected with the external device, control the user interface of the display to present the prompt information for prompting the user for a method of sending a pairing request based on the receipt of the function instruction; and in response to determining that the display apparatus and the external device have been paired and connected, control the display apparatus to implement corresponding functions based on the function instruction.

In some embodiments, the display apparatus is further configured to: in response to power on command, control the user interface of the display to display a navigation interface for pairing an external device with the display apparatus; the navigation interface can include a control which is variable depending on a connection state of the external device; where before the external device is paired successfully, the control is displayed as a first key for indicating cancelling the pairing operation; after the external device is paired successfully, the control is displayed as a second key for indicating skipping to other function configuration interface.

In some embodiments, the method can include: receiving an operation request from the external device; in response to the operation request, enabling the display apparatus to automatically perform corresponding operations without other operations from the user; where the operation request can include a pairing request and an unpairing request, the display apparatus is automatically paired and connected with the external device in response to the pairing request, and the display apparatus is automatically unpaired with the external device in response to the unpairing request.

In some embodiments, the method further can include: in response to receipt of the operation request, determining whether the display apparatus is paired and connected with the external device; in response to determining that the display apparatus is not paired and connected with the external device, using the operation request as the pairing request to automatically pair and connect with the external device; and in response to determining that the display apparatus and the external device have been paired and connected, using the operation request as the unpairing request to automatically unpair with the external device.

In some embodiments, the method further can include: receiving a function instruction from the external device; determining whether the display apparatus is paired and connected with the external device; in response to determining that the display apparatus is not paired with the external device, controlling the user interface of the display to display the prompt information for prompting the user for a method of sending a pairing request based on the receipt of the function instruction; in response to determining that the display apparatus and the external device have been paired and connected, controlling the display apparatus to implement corresponding functions based on the function instruction.

In some embodiments, the method further can include: in response to a power-on command, controlling the user interface of the display to display a navigation interface for pairing the external device to the display apparatus, the navigation interface including a control which is variable depending on a connection state between the external device and the display apparatus, the connection state comprises a stage of pairing process; where before the external device is successfully paired, the control is displayed as the first key for indicating cancelling the pairing operation; after the external device is successfully paired, the control is displayed as the second key for indicating skipping to other function configuration interface.

The beneficial effect of the embodiments of the present disclosure is that by constructing the pairing and unpairing instructions, the display apparatus can realize automatic identification of the current external device, as well as automatic pairing and unpairing; further, the simplified operation of the user can be realized through the automatic configuration process; further by constructing pairing success information and pairing connection information, the user interface can be simplified, and external devices can be quickly paired, the difficulty of pairing operations can be reduced, intelligent and automatic pairing can be realized, and complex pairing process operations can be avoided.

For convenience of explanation, the above description has been made in combination with specific embodiments. However, the above exemplary discussion is not intended to be exhaustive or to limit the embodiments to the specific forms disclosed above. On the basis of the above teachings, various modifications and variations can be obtained. The selection and description of the above embodiments are to better explain the principles and practical applications, such that those skilled in the art better use the embodiments and various variant embodiments suitable for specific use considerations.

What is claimed is:

1. A display apparatus, comprising:
a display, configured to display content from a broadcast system or network and/or a user interface;
one or more external device interfaces, configured to communicate with one or more external devices according to a communication protocol, where the communication protocol comprises a Bluetooth protocol and an infrared protocol; and
at least one processor, in connection with the display and the one or more external device interfaces, and configured to execute instructions to cause the display apparatus to:
in response to an instruction received from a first external device according to a first communication protocol, determine whether the display apparatus is paired and connected with the first external device according to a second communication protocol, the second communication protocol being different from the first communication protocol;
in response to determining that the display apparatus and the first external device have been paired and connected according to the second communication protocol, control the first external device to automatically unpair with the display apparatus according to the second communication protocol, to enable the display apparatus to unpair with the first external device; and
in response to determining that the display apparatus has not yet paired and connected with the first external device according to the second communication protocol, control the first external device to pair with the display apparatus according to the second communication protocol without a further operation from a user, control the display to present prompt information of a change of a connection state according to the change of the connection state of the display apparatus, and control the display to present pairing success information after the display apparatus has been paired and connected with the external device according to the second communication protocol.

2. The display apparatus according to claim 1, wherein the at least one processor is further configured to execute the instructions to cause the display apparatus to:
before the first external device is controlled to pair with the display apparatus, control the display to present a navigation interface for pairing the first external device with the display apparatus according to the second communication protocol,
wherein the navigation interface comprises a control which is variable, the control is displayed as a first key for indicating cancelling a pairing operation before the first external device is paired successfully with the display apparatus, and
the control is displayed as a second key for indicating skipping to other function configuration interface after the first external device is paired successfully with the display apparatus.

3. The display apparatus according to claim 1, wherein the at least one processor is further configured to execute the instructions to cause the display apparatus to:
automatically unpair with the first external device paired with the display apparatus without other operations from the user during unpairing process.

4. The display apparatus according to claim 2, wherein the at least one processor is further configured to execute the instructions to cause the display apparatus to:
receive a function instruction from the first external device based on the infrared protocol that requires data transmission according to the Bluetooth protocol; and
control the display to present prompt information for prompting the user for a method of sending a pairing request for Bluetooth pairing.

5. The display apparatus according to claim 4, wherein the function instruction comprises a trigger effect and function implementation instruction,
before the first external device is not paired with the display apparatus according to the Bluetooth protocol, the function instruction is configured to enable the display apparatus to trigger a pairing according to the Bluetooth protocol; and
after the first external device has been paired with the display apparatus according to the Bluetooth protocol, the function instruction is configured to enable the display apparatus to implement a corresponding function instruction.

6. The display apparatus according to claim 1, wherein the instruction received from the first external device is generated by long pressing a specific key on a remote controller.

7. The display apparatus according to claim 1, wherein the first external device comprises a remote controller supporting the Bluetooth protocol.

8. A display apparatus, comprising:
a display, configured to display content from a broadcast system or network and/or a user interface;
one or more external device interfaces, configured to communicate with one or more external devices according to a communication protocol, where the communication protocol comprises a Bluetooth protocol and an infrared protocol; and
at least one processor, in connection with the display and the one or more external device interfaces, and configured to execute instructions to cause the display apparatus to:
in response to an instruction received from a first external device according to a first communication protocol, determine whether the display apparatus is paired and connected with the first external device according to a second communication protocol;
in response to determining that the display apparatus and the first external device have been paired and connected according to the second communication protocol, control the first external device to automatically unpair with the display apparatus according to the second communication protocol, to enable the display apparatus to unpair with the first external device; and in response to determining that the display apparatus has not yet paired and connected with the first external device according to the second communication protocol, control the first external device to pair with the display apparatus according to the second communication protocol without a further operation from a user, control the display to present prompt information of a change of a connection state according to the change of the connection state of the display apparatus, and control the display to present pairing success information after the display apparatus has been paired and connected with the external device according to the second communication protocol, wherein the at least one processor is further configured to execute the instructions to cause the display apparatus to:

in response to a power-on command for the display apparatus, display a navigation interface for pairing the first external device with the display apparatus, wherein the navigation interface comprises a control which is variable depending on a connection state between the first external device and the display apparatus;

the connection state comprises a stage of a pairing process;

before the first external device is successfully paired with the display apparatus, the control is displayed as a first key for indicating cancelling a pairing operation; and after the first external device is successfully paired with the display apparatus, the control is displayed as a second key for indicating skipping to other function configuration interface.

9. A control method for a display apparatus, and comprising:

in response to an instruction received from a first external device according to a first communication protocol, determining whether the display apparatus is paired and connected with the first external device according to a second communication protocol, the second communication protocol being different from the first communication protocol; wherein the display apparatus communicates with one or more external devices according to a communication protocol, and the communication protocol comprises a Bluetooth protocol and an infrared protocol;

in response to determining that the display apparatus and the first external device have been paired and connected according to the second communication protocol, controlling the first external device to automatically unpair with the display apparatus according to the second communication protocol, to enable the display apparatus to unpair with the first external device; and in response to determining that the display apparatus has not yet paired and connected with the first external device according to the second communication protocol, controlling the first external device to pair with the display apparatus according to the second communication protocol without a further operation from a user, presenting prompt information of a change of a connection state according to the change of the connection state of the display apparatus, and presenting pairing success information after the display apparatus has been paired and connected with the external device according to the second communication protocol.

10. The control method according to claim 9, further comprising:

before the first external device is controlled to pair with the display apparatus, presenting a navigation interface for pairing the first external device with the display apparatus according to the second communication protocol, wherein the navigation interface comprises a control which is variable, the control is displayed as a first key for indicating cancelling a pairing operation before the first external device is paired successfully with the display apparatus, and the control is displayed as a second key for indicating skipping to other function configuration interface after the first external device is paired successfully with the display apparatus.

11. The control method according to claim 9, further comprising:

automatically unpairing with the first external device paired with the display apparatus without other operations from the user during unpairing process.

12. The control method according to claim 10, further comprising:

receiving a function instruction from the first external device based on the infrared protocol that requires data transmission according to the Bluetooth protocol; and presenting prompt information for prompting the user for a method of sending a pairing request for Bluetooth pairing.

13. The control method according to claim 12, wherein the function instruction comprises a trigger effect and function implementation instruction, before the first external device is not paired with the display apparatus according to the Bluetooth protocol, the function instruction is configured to enable the display apparatus to trigger a pairing according to the Bluetooth protocol; and after the first external device has been paired with the display apparatus according to the Bluetooth protocol, the function instruction is configured to enable the display apparatus to implement a corresponding function instruction.

14. The control method according to claim 9, wherein the instruction received from the first external device is generated by long pressing a specific key on a remote controller.

15. The control method according to claim 9, wherein the first external device comprises a remote controller supporting the Bluetooth protocol.

16. The control method according to claim 9, further comprising:

in response to a power-on command for the display apparatus, displaying a navigation interface for pairing the first external device with the display apparatus, wherein the navigation interface comprises a control which is variable depending on a connection state between the first external device and the display apparatus;

the connection state comprises a stage of a pairing process;

before the first external device is successfully paired with the display apparatus, the control is displayed as a first key for indicating cancelling a pairing operation; and after the first external device is successfully paired with the display apparatus, the control is displayed as a second key for indicating skipping to other function configuration interface.

* * * * *